United States Patent
Copeland

(10) Patent No.: US 10,623,572 B1
(45) Date of Patent: Apr. 14, 2020

(54) SEMANTIC CRM TRANSCRIPTS FROM MOBILE COMMUNICATIONS SESSIONS

(71) Applicant: N3, LLC, Atlanta, GA (US)

(72) Inventor: Shannon L. Copeland, Atlanta, GA (US)

(73) Assignee: N3, LLC, Atlanta, GA (US)

(*) Notice: Subject to any disclaimer, the term of this patent is extended or adjusted under 35 U.S.C. 154(b) by 0 days.

(21) Appl. No.: 16/198,742

(22) Filed: Nov. 21, 2018

(51) Int. Cl.
| H04M 3/51 | (2006.01) |
| G06Q 30/00 | (2012.01) |
| H04M 3/42 | (2006.01) |
| H04M 3/22 | (2006.01) |
| G06F 16/901 | (2019.01) |

(52) U.S. Cl.
CPC ...... H04M 3/5191 (2013.01); G06F 16/9024 (2019.01); G06Q 30/016 (2013.01); H04M 3/2218 (2013.01); H04M 3/42221 (2013.01); H04M 3/5175 (2013.01); H04M 2201/40 (2013.01); H04M 2250/60 (2013.01)

(58) Field of Classification Search
CPC .......... G06F 9/44; G06F 16/9024; G06F 9/48; G06F 19/00; G06Q 10/06; G06Q 30/016; G06Q 30/02; G06Q 40/08; G06Q 40/02; G10L 15/00; G10L 17/26; H04M 2201/40; H04M 2250/60; H04M 3/2218; H04M 3/42221; H04M 3/493; H04M 3/51; H04M 3/5175; H04M 3/5191; H04M 3/523; H04M 7/00; H04M 3/00; H04L 12/58
USPC ...... 370/352; 379/85, 88.01, 265.01, 265.02, 379/265.03, 265.1, 265.12, 88.18, 265.06, 379/265.09, 266.07; 704/235, 254; 705/44, 14.25; 709/204, 227; 707/750; 713/164; 717/176
See application file for complete search history.

(56) References Cited

U.S. PATENT DOCUMENTS

| 6,701,366 B1* | 3/2004 | Kallas ............... H04M 3/42144 370/259 |
| 7,275,083 B1 | 9/2007 | Seibel et al. |
| 7,486,785 B2* | 2/2009 | Flores .................... H04M 3/38 379/265.01 |
| 7,962,361 B2* | 6/2011 | Ramchandani ........ G06Q 30/02 705/14.25 |
| 8,108,237 B2 | 1/2012 | Bourne et al. |

(Continued)

FOREIGN PATENT DOCUMENTS

WO    2016139666 A1    9/2016

OTHER PUBLICATIONS

International Search Report dated Nov. 28, 2018 for PCT/US2018/049813.

(Continued)

*Primary Examiner* — Gerald Gauthier
(74) *Attorney, Agent, or Firm* — OhanianIP Law Firm; H. Artoush Ohanian

(57) ABSTRACT

Customer relationship management ('CRM') implemented in a computer system, including administering by the computer system a communications session that includes a sequence of communications contacts between a tele-agent and one or more customer representatives, the session and each contact composed of structured computer memory of the computer system; and generating by the computer system a digital transcript of the content of the communications contacts.

18 Claims, 17 Drawing Sheets

(56) References Cited

U.S. PATENT DOCUMENTS

| | | | | |
|---|---|---|---|---|
| 8,600,804 | B2* | 12/2013 | Ramchandani | G06Q 30/02 705/14.23 |
| 8,649,500 | B1* | 2/2014 | Cohen | H04M 3/5158 379/265.01 |
| 9,049,295 | B1* | 6/2015 | Cooper | H04M 3/493 |
| 9,165,556 | B1* | 10/2015 | Sugar | G10L 15/10 |
| 9,848,082 | B1* | 12/2017 | Lillard | H04M 3/5141 |
| 9,948,783 | B1* | 4/2018 | Farrell | H04M 3/5191 |
| 9,998,596 | B1* | 6/2018 | Dunmire | H04M 3/5158 |
| 10,027,803 | B2* | 7/2018 | Krinsky | H04M 3/5231 |
| 10,101,976 | B2* | 10/2018 | Cavalcante | G06F 8/34 |
| 10,438,595 | B2* | 10/2019 | Kim | G10L 17/06 |
| 10,453,032 | B1* | 10/2019 | Obeng | G06Q 10/10 |
| 2004/0143473 | A1 | 7/2004 | Tivey et al. | |
| 2005/0002502 | A1* | 1/2005 | Cloran | G06Q 10/06311 379/88.18 |
| 2005/0044357 | A1* | 2/2005 | Fano | G06Q 10/10 713/164 |
| 2006/0095273 | A1 | 5/2006 | Montvay et al. | |
| 2006/0098625 | A1* | 5/2006 | King | H04L 29/06027 370/352 |
| 2006/0239439 | A1* | 10/2006 | Blackwood | H04M 3/5191 379/265.01 |
| 2007/0019618 | A1* | 1/2007 | Shaffer | H04L 29/06027 370/352 |
| 2007/0064913 | A1* | 3/2007 | Shaffer | H04L 65/80 379/265.02 |
| 2007/0233561 | A1 | 10/2007 | Golec | |
| 2009/0271192 | A1* | 10/2009 | Marquette | G09B 13/00 704/235 |
| 2010/0104087 | A1* | 4/2010 | Byrd | H04M 3/42221 379/265.09 |
| 2011/0206198 | A1* | 8/2011 | Freedman | G06Q 30/06 379/265.03 |
| 2011/0264451 | A1* | 10/2011 | Hoepfinger | G10L 15/063 704/235 |
| 2012/0143881 | A1* | 6/2012 | Baker | G06F 16/93 707/750 |
| 2013/0163731 | A1* | 6/2013 | Yan | H04M 3/523 379/85 |
| 2013/0204663 | A1 | 8/2013 | Kahlow | |
| 2014/0164502 | A1* | 6/2014 | Khodorenko | H04L 67/306 709/204 |
| 2014/0189680 | A1* | 7/2014 | Kripalani | G06F 11/3664 717/176 |
| 2014/0201234 | A1 | 7/2014 | Lee et al. | |
| 2015/0242410 | A1 | 8/2015 | Pattabhiraman et al. | |
| 2015/0294405 | A1* | 10/2015 | Hanson | G06Q 40/02 705/44 |
| 2016/0006875 | A1* | 1/2016 | Burmeister | H04M 3/5158 379/265.06 |
| 2016/0019882 | A1* | 1/2016 | Matula | G10L 15/187 704/254 |
| 2016/0036981 | A1* | 2/2016 | Hollenberg | H04M 3/5233 379/265.12 |
| 2016/0036982 | A1* | 2/2016 | Ristock | H04M 3/5233 379/265.1 |
| 2016/0036983 | A1* | 2/2016 | Korolev | H04M 3/5233 379/265.12 |
| 2017/0017517 | A1* | 1/2017 | Kandappan | G06Q 10/063114 |
| 2017/0091390 | A1* | 3/2017 | Joul | G06Q 30/016 |
| 2017/0195488 | A1* | 7/2017 | Pendyala | H04M 3/5183 |
| 2017/0200220 | A1* | 7/2017 | Nicholson | G06F 3/04847 |
| 2017/0264575 | A1* | 9/2017 | Willshire | H04L 43/50 |
| 2018/0115644 | A1* | 4/2018 | Al-Khaja | H04M 3/5191 |
| 2018/0315000 | A1* | 11/2018 | Kulkarni | G06Q 10/06395 |
| 2018/0315001 | A1* | 11/2018 | Garner | G06Q 10/06398 |
| 2018/0338040 | A1* | 11/2018 | Carty | G06F 17/2705 |
| 2018/0365772 | A1* | 12/2018 | Thompson | G06N 7/005 |
| 2019/0080370 | A1* | 3/2019 | Copeland | G06Q 30/0281 |
| 2019/0188617 | A1* | 6/2019 | Copeland | G06F 16/90335 |
| 2019/0220794 | A1* | 7/2019 | Kulkarni | G06Q 10/06395 |
| 2019/0394332 | A1* | 12/2019 | Dunmire | H04M 3/5158 |

OTHER PUBLICATIONS

International Search Report dated Feb. 22, 2019 for PCT/US2018/065584.

* cited by examiner

SEMANTIC CRM TRANSCRIPTS FROM MOBILE COMMUNICATIONS SESSIONS

BACKGROUND

Customer Relationship Management ('CRM') is an approach to managing a company's interaction with current and potential customers. CRM implements data analysis of customers' history with a company to improve business relationships with customers, specifically focusing on customer retention and sales growth. CRM systems compile data from a range of communication channels, including telephone, email, live chat, text messaging, marketing materials, websites, and social media. Through the CRM approach and the systems used to facilitate it, businesses learn more about their target audiences and how to best address their needs.

Enterprise CRM systems can be huge. Such systems can include data warehouse technology, used to aggregate transaction information, to merge the information with information regarding CRM products and services, and to provide key performance indicators. CRM systems aid managing volatile growth and demand and implement forecasting models that integrate sales history with sales projections. CRM systems track and measure marketing campaigns over multiple networks, tracking customer analysis by customer clicks and sales. Some CRM software is available through cloud systems, software as a service (SaaS), delivered via network and accessed via a browser instead of installed on a local computer. Businesses using cloud-based CRM SaaS typically subscribe to such CRM systems, paying a recurring subscription fee, rather than purchasing the system outright.

Despite their sheer size, many CRM systems today lack the infrastructure to make full use of the information they can access. Customer contacts alone, for example can be difficult to track. A tele-agent today does not limit customer contacts merely to phone calls from a desk in a call center. Such contacts are often administered through contact centers that can administer multiple modes of contact, phone, text, email, and so on, among multiple agents across multiple locations. When a particular tele-agent representing a contact center on behalf of a marketing client accepts a phone call from a customer representative, it is entirely possible that there can have been multiple intervening contacts with that customer representative, including text messages and emails or even automated messages from artificial intelligence agents, very difficult for the current tele-agent to know or sort.

DETAILED DESCRIPTION OF EXAMPLE EMBODIMENTS

Figure 1:
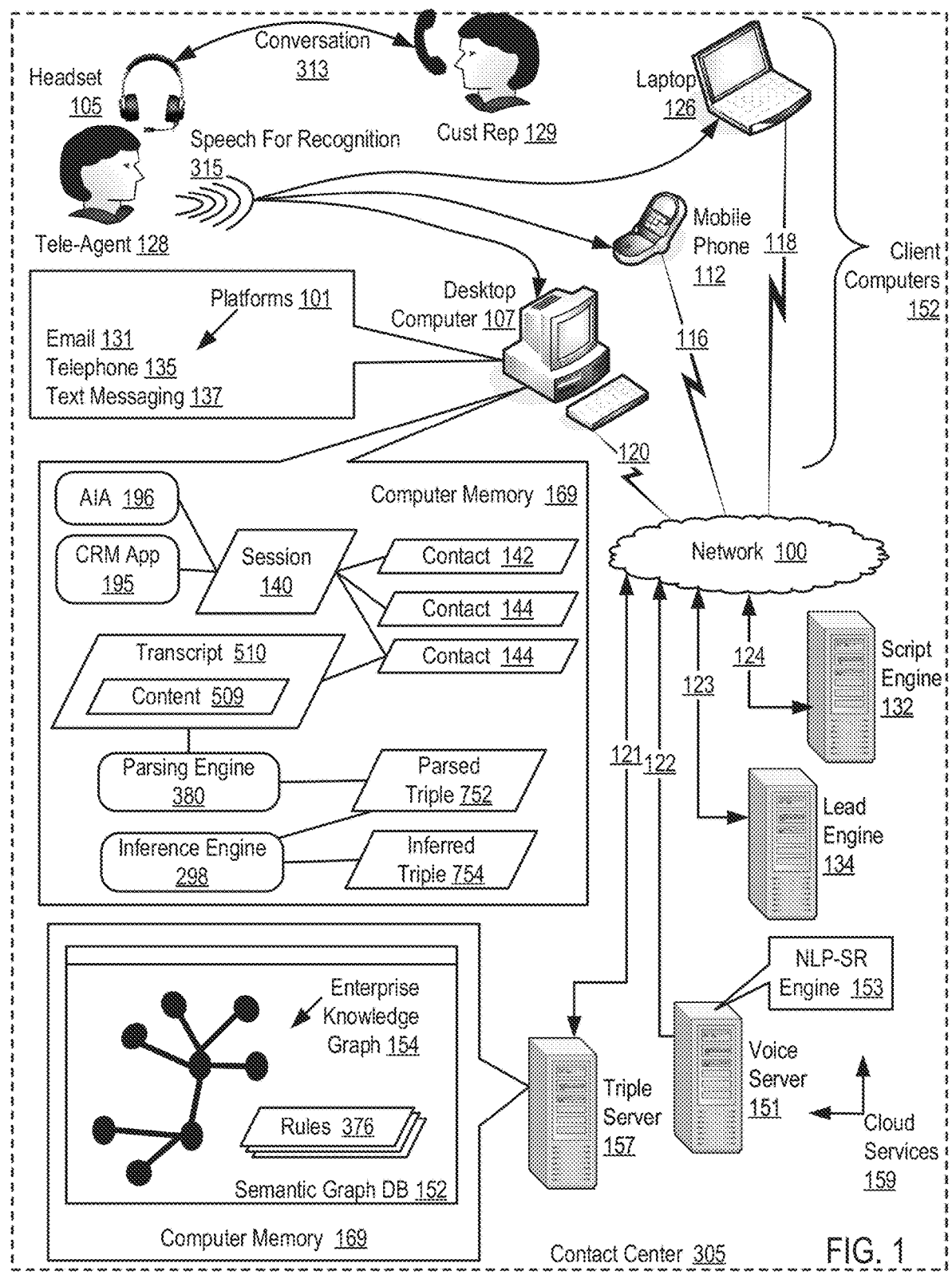
FIG. 1 sets forth a network diagram illustrating an example system for customer relationship management ("CRM") according to embodiments of the present invention.

Example methods and apparatus for customer relationship management ("CRM") implemented in a computer system are described with reference to the accompanying drawings, beginning with FIG. 1. FIG. 1 sets forth a network diagram illustrating an example computer system for CRM according to embodiments of the present invention. The computer system in the example of FIG. 1 includes client computers (152) and several servers, a triple server (157), a voice server (151), a lead engine (134), and a script engine (132). The client computers and the servers, including the lead engine and the script engine, taken together compose an overall computer system that implements CRM according to embodiments of the present invention. A client computer (152) is automated computing machinery configured for CRM with CRM-related I/O through a display, a graphical user interface, or a speech-enabled interface that accepts and recognizes speech from a user and expresses to a user voice prompts and speech responses. Such devices are referred to as client devices because they implement the client side of computer architectures that carry out CRM according to embodiments. Client computers in the example of FIG. 1 include a desktop computer (107), a mobile phone (112), and a laptop computer (126), any or all of which can server as a workstation for a tele-agent carrying out CRM in, for example, a contact center (305). The client computers are coupled for data communications by wireless connections (116, 118, 120) through the network (100) to the triple server (157), the voice server (151), the lead engine (134), and the script engine (132).

A lead engine (134) is automated computing machinery that gathers leads from various resources and provides them to a tele-agent through a GUI for use with customers and prospective customers. A lead is structured data representing a customer or potential customer typically including a lead ID, lead name, company, role of the lead, address of the lead or company, phone number of the lead and other relevant information as will occur to those of skill in the art. Such a lead may be implemented as a record, message, object, or other data structure useful to automated computing machinery for automatic lead generation and presentation through a GUI to a tele-agent.

A script engine (206) is automated computing machinery that creates in real-time a dynamic script for a tele-agent to use in communicating with a customer. A dynamic script is a script that changes in real-time in dependence upon various factors such as current industry trend data and often the specific products that the tele-agents supports and the products that the customer does or does not have. That is, the dynamic script is dynamic in the sense that it changes in real-time based on industry trends. The sentences in the script are dynamically reordered, added, or deleted in real-time for the benefit of the customer. Such sentences may be dynamically altered in the script by being dynamically reordered or created in real-time, retrieved from a repository of relevant industry and software descriptions, provided by other tele-agents, or in other ways as will occur to those of skill in the art.

Automated computing machinery, as that phrase is used in this specification, means a module, segment, or portion of code or other automated computing logic, hardware, software, firmware, or the like, as well as a combination of any of the aforementioned, local or remote. Automated computing machinery is often implemented as executable instructions, physical units, or other computing logic for implementing specified logical functions.

A tele-agent (128) is a person, an agent of a contact center, responsible for selling or supporting commercial products and services. A customer representative (129) is a person who represents a customer, a company or other enterprise that is a current or prospective purchaser of goods or services of a contact center.

A CRM contact center (305) is an organization of personnel and computer resources that provide CRM according to embodiments of the present invention. In the example of FIG. 1, a dotted line indicates the extent of the contact center (305). The extent is logical rather than physical. All of the resources and personnel that make up the contact center can have the same physical location, or the contact center can be highly virtualized, with separate physical locations for tele-agents, for client devices, and for servers, for example. Some or all tele-agents can work together in a call center that provides agents with desks, workstations, telephones, and so on. All or some of the tele-agents can work from home offices or from mobile locations. Script and lead engines may be located in data centers separate from data centers that house triple servers and voice servers, and so on, for various physical locations composing a same logical contact center.

A semantic graph database (152) is a database that uses graph structures for semantic queries with nodes, edges and properties to represent and store data. A key concept of this database system is the graph (or edge or relationship), which directly relates data items in a data store. The relationships allow data in the store to be linked together directly, and in many cases retrieved with one operation. Such a graph database contrasts with conventional relational databases, where links among data are mere indirect metadata, and queries search for data within the store using joins to collect related data. Graph databases, by design, make explicit relations among data and allow simple and fast retrieval of complex hierarchical structures that are difficult to model in relational systems.

The underlying storage mechanism of graph databases can vary. Some depend on a relational engine and store the graph data in a table. Others use a key-value store or document-oriented database for storage, making them inherently NoSQL structures. Retrieving data from a graph database often requires a query language other than SQL, which was designed for relational databases and does not elegantly handle traversing a graph. There are a number of systems, most often tightly tied to one product and there are some multi-vendor query languages like Gremlin, SPARQL, and Cypher. In addition to having query language interfaces, some, if not most, graph databases are accessed through application programming interfaces (APIs).

Graph databases are based on graph theory, and employ nodes, edges, and properties. Nodes represent entities such as people, businesses, accounts, or any other item to be tracked. They are roughly the equivalent of the record, relation, or row in a relational database, or the document in a document database. Edges, also termed graphs or relationships, are represented by the lines that connect nodes to other nodes; they represent the relationship between them. Meaningful patterns emerge when examining the connections and interconnections of nodes, properties, and edges. Edges are the key concept in graph databases, representing an abstraction that is not directly implemented in other systems. Properties are germane information that relate to nodes. For example, if N3 were one of the nodes, it might be tied to properties such as web-services support, cloud-computing, or a word that starts with the letter N, depending on which aspects of N3 are germane to a given database.

The graph database of FIG. 1 is a semantic graph database and stored within it is an enterprise knowledge graph (154). The example enterprise knowledge graph of FIG. 1 can be implemented, for example, according to the Resource Description Framework ('RDF'). In such an implementation, the enterprise knowledge graph has each data item represented by a resource identifier. Such resource identifiers may include a uniform resource identifier ('URI'), an internationalized resource identifier ('IRI'), a uniform resource locator ('URL'), a literal, a non-literal, or any other resource identifier. RDF makes resource identifier relationships between data items the central attribute of its overall data model. Resource identifiers, such as URI's, are created with data and linked together using relationships that are also named with resource identifiers. The fact that all identifiers in an RDF data store are named with identifiers means that all data items, including relationship, edges, or properties, are expressly defined and self-defined.

The enterprise knowledge graph (1545) of FIG. 1 has characteristics of mathematical directed graphs in that it is composed of vertices (a.k.a. nodes) and directed edges. Each edge connects two vertices, has a type, and can have one or more properties. Each property in this example may be implemented as a key-value pair. The ability to characterize an edge and attach properties to it increases the semantic expressiveness of such a knowledge graph. This description of graph databases and semantic graph databases is for explanation and not for limitation. In fact, alternative embodiments may include relational databases, Non-SQL data stores, files, text documents, spreadsheets, and other viable database structures.

Computer memory (169) can include cache, random access memory ("RAM"), disk storage, and so on, most forms of computer memory. Computer memory so configured typically resides upon speech-enabled devices, or, as shown here (169), upon one or more triple servers (157).

Words of text, spoken or typed, among other things such as images, digital text, and the like, typically compose at least some of the content (509) of sessions and contacts and therefore of transcripts (510) according to embodiments.

Such words can be words typed into a text box, words from email or text messages, or words of digitized speech for recognition (315) from a conversation (313). The speech for recognition can be the entire conversation, where, for example, both persons speaking are in the same room, and the entire conversation is picked up by a microphone on a speech-enabled device. The scope of speech for recognition can be reduced by providing to a speech-enabled device only one side of the conversation, as only through a microphone on a headset (105). The scope of speech for recognition can be further reduced by providing for recognition only speech that responds to a prompt from a VoiceXML dialogue executing on a client computer. As the scope of speech for recognition is reduced, data processing burdens are reduced across the system as a whole, although it remains an option, in some embodiments at least, to recognize the entire conversation and stream across a display a flow of all words in the conversation.

Speech from the conversation (313) is recognized into digitized words by operation of a natural language processing speech recognition ("NLP-SR") engine (153), shown here disposed upon a voice server (151), but also amenable to installation on speech-enabled client computers. In addition to digitizing the word (509) by speech recognition functions of a voice server (151), for a further example, the word (509) can be digitized by operation of widgets of a graphical user interface (110). Or, for an even further example, the word (509) can be digitized by a user's (128) typing it into a text entry box (366) of a graphical user interface (110).

The AIA (196) is an implementation of artificial intelligence, automation that seeks to present behavior that resembles human behavior in communications and learning. The AIA operates with a voice server (151) to present human-like speech. The AIA operates a natural language processor to present human-like text in emails. And the AIA implements machine learning by expanding an enterprise knowledge graph (154) with newly parsed triples (752) and newly inferred triples (754). The AIA is said to be "of" a CRM application (195), optionally because in some embodiments it is an actual component of the CRM application, or optionally because the AIA effectively operates the CRM through an application programming interface, so that the AIA as 'agent' is, to some extent at least, an agent of the CRM application in particular and the contact center generally. In administering, effecting, or carrying out communications with both the tele-agent and the customer representative the AIA functions as a kind of wrapper or container of a CRM application (195) and the computer system in general. That is, in embodiments, the tele-agent and the customer representative often encounter the entire contact center (305) primarily through the AIA (196).

In the example of FIG. 1, the AIA (196) establishes, upon a first communications contact (142) between a tele-agent (128) and a customer representative (129), as structure of computer memory (169) of the computer system, a communications session (140). The AIA then administers through the communications session across communications platforms (101) a sequence of communications contacts, including the first contact (142) and also subsequent communications contacts (144), between the tele-agent and the customer representative. Examples of communications platforms include email platforms, chatbots, telephones, text messaging platforms, and so on. Examples of text messaging platforms that can be adapted as CRM communications platforms according to embodiments include SMS messaging clients that operate over telephone systems, web chat inline within a web application, and web-oriented messaging applications such as WhatsApp™, Facebook Messenger™ Slack™, Snapchat™, Cryptocat™, Kik™, Google Hangouts™, Line™, MeowChat™, Ethan™, China's WeChat™ and QQ Messenger™, Viber™, Korea's KakaoTalk™, Vietnam's Zalo™, as well as direct messaging functions in Instagram™ and Twitter™.

In many embodiments, the AIA establishes, as structure of computer memory (169) of the computer system, a session (140) as an object-oriented module of automated computing machinery whose structure and contents (509) are also stored as semantic triples in an enterprise knowledge graph (154). That is, a session in such embodiments is established, initially at least, as an instance of an object-oriented session class. Establishing such a session can include storing in computer memory as member data elements of the session a subject code, a timestamp, identification of the tele-agent, identification of the customer representative, and optionally as well other information regarding the session.

The AIA in this example administers a sequence of contacts (142, 144) by establishing each contact as an object-oriented module of automated computing machinery that structures computer memory (169) of the computer system and whose structure and contents are also stored as semantic triples in an enterprise knowledge graph (154). That is, a contact in this example is established initially at least as an instance of an object-oriented contact class. Administering a sequence of contacts includes recording in computer memory as member data elements of each contact a timestamp beginning the contact, duration of the contact, a session identifier for the contact, platform type, contact status, any communications content of the contact, and optionally as well other information regarding the contact.

Administering contacts across platforms includes administering contacts asynchronously across a same platform or across different platforms, and administering across platforms includes administering across platform types. A first contact in a session can be by telephone with a subsequent contact by the same telephone or a different telephone. A first contact can be by email with subsequent contacts by telephone or text message.

Administering contacts across platforms includes administering contacts across physical locations of platforms. A first contact of a session can be by landline telephone in a call center with a subsequent contact by cell phone in a restaurant. A first contact can be by email from a desk in a call center with subsequent contacts by cell phone or text message from a supermarket.

The AIA (196) and the CRM application (195) in coordination with other components of the overall computer system in the example of FIG. 1 also operate generally to generate a digital transcript (510) of the content (509) of communications contacts (142, 144). The content (509) can include content from text messaging and email identified by author and content from telephone conversations identified by speaker. The AIA (196) and the CRM application (195) and the overall computer system in the example of FIG. 1 generate a transcript by gathering text content from contacts that effect communications by text messages and emails and by storing the gathered text content as semantic triples in an enterprise knowledge graph (154).

Also in the example of FIG. 1, generating a transcript can include capturing speech content (315) from telephone conversations (313) between a tele-agent (128) and a customer representative (129), recognizing the speech content into digitized text, and storing the digitized text as semantic triples in an enterprise knowledge graph (154). Similarly, generating a transcript can include storing speech content from telephone conversations between the tele-agent and the customer representative, that is, storing that content as captured audio recordings, and storing, as semantic triples in an enterprise knowledge graph, storage locations of the stored speech. Such storage locations can be expressed as URLs that identify the locations in cyberspace where the audio recording are stored. Generating a transcript can include identifying by voiceprint comparison the speakers in a conversation between the tele-agent and one or more customer representatives. Generating a transcript can include determining by voiceprint comparison during a telephone conversation between the tele-agent and a customer representative that the customer representative is unknown to the computer system, recording by the computer system a voiceprint for the unknown representative, identifying by the computer system, by prompt and response for an identification, the unknown representative, and recording, by the computer system in association with the recorded voiceprint, the identity of the now-identified representative. That is, for example, the AIA can interrupt a conversation and say, "Excuse me, I did not catch your name." Or the AIA can speak to the tele-agent after a call is concluded, "Excuse me, who was that on the phone just now?"

The example computer system of FIG. 1 includes a parsing engine (380) that parses into parsed triples (752) of a description logic, the content (509) of a transcript (510), including the content of the communications contacts (142, 144) and possibly also certain content of the pertinent session (140). The example computer system of FIG. 1 also includes an inference engine (298) that infers from the parsed triples (752) according to inference rules (376) of an enterprise knowledge graph, inferred triples (754). The functions of the example computer system of FIG. 1 include storing the parsed triples (752) and the inferred triples (754) in the enterprise knowledge graph (154) for use in CRM according to embodiments.

A parsed triple (752) is a semantic triple composed of, for example, a subject, a predicate, and an object, that is 'parsed' in the sense that it is composed from elements derived from a session or a contact, including, for example, recognized speech, selections from GUI widgets, text typed through a GUI, or the like. That is, "parsing" means taking component elements of sessions and contacts from various sources and forming them into semantic triples. Parsing can include forming into semantic triples raw text from data entry or conversational speech that is processed by an NLP-SR engine into parts of speech. Such parts of speech can be formed into triples by placing each part appropriately as subject-predicate-object in a triple.

An inferred triple (754) is inferred from a parsed triple (752) according to inference rules (376) that govern relations among data elements in a knowledge graph, here, an enterprise knowledge graph (154). Inferencing is a process by which new triples are systematically added to a graph based on patterns in existing triples. Information integration, inclusion of newly inferred triples, can be achieved by invoking inferencing before or during a query process. A query executed with inference rules in an engine designed not only for queries but also for inferencing, returns not only asserted data but also inferred information. Readers will recognize that all such references to "data" or "information" or "knowledge" are in fact references to semantic triples.

Here is an example of an inference rule:

| IF | { <A> <is a subclass of> <B> } |
|---|---|
| AND | { <x> <is of type> <A> } |
| THEN | { <x> <is of type> <B> } |

In plain language, this rule says that if class A is a subclass of class B, anything of type A is also of type B. We refer to this rule as a 'type propagation rule,' A is a subclass of B, x is an A, x is also a B. Or in a SPARQL CONSTRUCT query, this type propagation rule can be expressed:

| CONSTRUCT | { ?R :type ?B } |
|---|---|
| WHERE | { ?A :subClassOf ?B . |
|  | ?R :type ?A } |

For further explanation, assume these example triples are previously asserted:

| <Henleys> | <subClassOF> | <Shirts> |
|---|---|---|
| <Shirts> | <subClassOF> | <MensWear> |
| <Blouses> | <subClassOF> | <WomensWear> |
| <Oxfords> | <subClassOF> | <Shirts> |
| <Tshirts> | <subClassOF> | <Shirts> |
| <ChamoisHenley> | <isOfType> | <Henleys> |
| <ClassicOxford> | <isOfType> | <Oxfords> |
| <ClassicOxford> | <isOfType> | <Shirts> |
| <BikerT> | <isOfType> | <Tshirts> |
| <BikerT> | <isOfType> | <MensWear> |

Applying the type propagation rule results in the following inferences:

| <ChamoisHenley> | <isOfType> | <Shirts> |
|---|---|---|
| <ChamoisHenley> | <isOfType> | <MensWear> |
| <ClassicOxford> | <isOfType> | <Shirts> |
| <ClassicOxford > | <isOfType> | <MensWear> |
| <BikerT> | <isOfType> | <Shirts> |
| <BikerT> | <isOfType> | <MensWear> |

Two of the inferred triples were also previously asserted:

| <ClassicOxford> | <isOfType> | <Shirts> |
|---|---|---|
| <BikerT> | <isOfType> | <MensWear> |

And here, for an inference engine that simply inserts the inferred triples back into the asserted graph, is the new graph, with inferred triples in bold italics:

| <Henleys> | <subClassOF> | <Shirts> |
|---|---|---|
| <Shirts> | <subClassOF> | <MensWear> |
| <Blouses> | <subClassOF> | <WomensWear> |
| <Oxfords> | <subClassOF> | <Shirts> |
| <Tshirts> | <subClassOF> | <Shirts> |
| <ChamoisHenley> | <isOfType> | <Henleys> |
| *<ChamoisHenley>* | *<isOfType>* | *<Shirts>* |
| *<ChamoisHenley>* | *<isOfType>* | *<MensWear>* |
| <ClassicOxford> | <isOfType> | <Oxfords> |
| <ClassicOxford > | <isOfType> | <Shirts> |
| *<ClassicOxford>* | *<isOfType>* | *<MensWear>* |
| <BikerT> | <isOfType> | <Tshirts> |
| <BikerT> | <isOfType> | <MensWear> |
| *<BikerT>* | *<isOfType>* | *<Shirts>* |

The underlying purpose of such inferencing is to create data that are more connected, better integrated, and in which the consistency constraints on the data are expressed in the data itself. The data itself describes how the data can be used. For purposes of making data more integrated and consistent, simple inferences like those just described are often more useful than elaborate ones, not very exciting, but very useful. It is this kind of workaday consistency completion of CRM data that can be done with inferencing according to embodiments. Although inferencing of this kind may seem at first glance to have little significance, in fact, this kind of inferencing is exactly the kind of correlation that effects consistency in large data stores.

In this paper, "parsed triples" are triples parsed more or less in real time from structure and content of contacts and sessions as or promptly after a contact occurs. Possibly many of the triples in the enterprise knowledge graph were parsed at some point, but, nevertheless, for clarity of description in this paper, triples already in the enterprise knowledge graph are "asserted triples," and triples just now parsed from structure and content of a session and a contact are "parsed triples." "Inferred triples" are triples inferred more or less in real time from parsed triples as a contact occurs or promptly afterwards. Possibly many of the triples in the enterprise knowledge graph were inferred at some point, but, nevertheless, for clarity of description in this paper, triples already in the enterprise knowledge graph are "asserted triples," and triples just now inferred from triples parsed from a session or contact are "inferred triples."

There is no structural, functional, or logical difference among these triples. Asserted triples, parsed triples, inferred triples, they are all exactly the same kind of entity. The labels "asserted," "parsed," and "inferred" are used here merely for ease of explanation, not for identifications of differences in kind. All of these triples are three-part expressions of information conforming to some form of defined logic of a knowledge graph, in some embodiments a description logic, in some embodiments a logic that supports decidability.

In some embodiments, the enterprise knowledge graph (154) may include all or most information describing or pertinent to or useful in an entire corporate enterprise, financials, business entities and structures, employee data, incorporation data, transactions, contracts, sales history, product descriptions, and so on, and so on. Thus, CRM information is a subset of overall corporate information, and asserted, parsed, and inferred triples are kinds of CRM information. The present description of triples as subgraphs of an overall enterprise knowledge graph is for explanation rather than limitation. In some embodiments at least, for various reasons, CRM data, communications session data, contact data, customer data, information related to customer representatives, or call note data can be implemented in separate graphs rather than subgraphs. In the example of FIG. 1, the enterprise knowledge graph (154) is implemented in semantic triples organized and connected according to at least one form of semantic logic, such as, for example, a predicate logic or a description logic. In the example of FIG. 1, the enterprise knowledge graph is composed of semantic triples of a defined logic that includes all CRM-related knowledge that is available to a tele-agent through the overall computer system. The triples are semantic triples in the sense that such triples have meanings defined by inferences, inferences expressly described in additional triples, which are here referred to as "inferred triples."

A triple (752, 754) is a three-part statement expressed in a form of logic. Depending on context, different terminologies are used to refer to effectively the same three parts of a statement in a logic. In first order logic, the parts are called constant, unary predicate, and binary predicate. In the Web Ontology Language ("OWL") the parts are individual, class, and property. In some description logics the parts are called individual, concept, and role. In this paper, the elements of a triple are referred to as subject, predicate, and object—and expressed like this: <subject> <predicate><object>—or like this: (subject predicate object)—or in other abstract forms intended to be read by a human. There are many modes of expression for triples. Elements of triples can be represented as Uniform Resource Locaters ("URLs"), Uniform Resource Identifiers ("URIs"), or International Resource Identifiers ("IRIs"). Triples can be expressed in N-Quads, Turtle syntax, TriG, Javascript Object Notation or "JSON," the list goes on and on. The expression used here, subject-predicate-object in angle brackets or parenthesis, is a form of abstract syntax, optimized for human readability rather than machine processing, although its substantive content is correct for expression of triples. Using this abstract syntax, here are examples of triples:

<Bob> <is a> <person>
<Bob> <is a friend of> <Alice>
<Bob> <is born on> <the $4^{th}$ of July 1990>
<Bob> <is interested in> <the Mona Lisa>
<the Mona Lisa> <was created by> <Leonardo da Vinci>
<the video 'La Joconde á Washington'> <is about> <the Mona Lisa>

The same item can be referenced in multiple triples. In this example, Bob is the subject of four triples, and the Mona Lisa is the subject of one triple and the object of two. This ability to have the same item be the subject of one triple and the object of another makes it possible to effect connections among triples, and connected triples form graphs.

Figure 2:
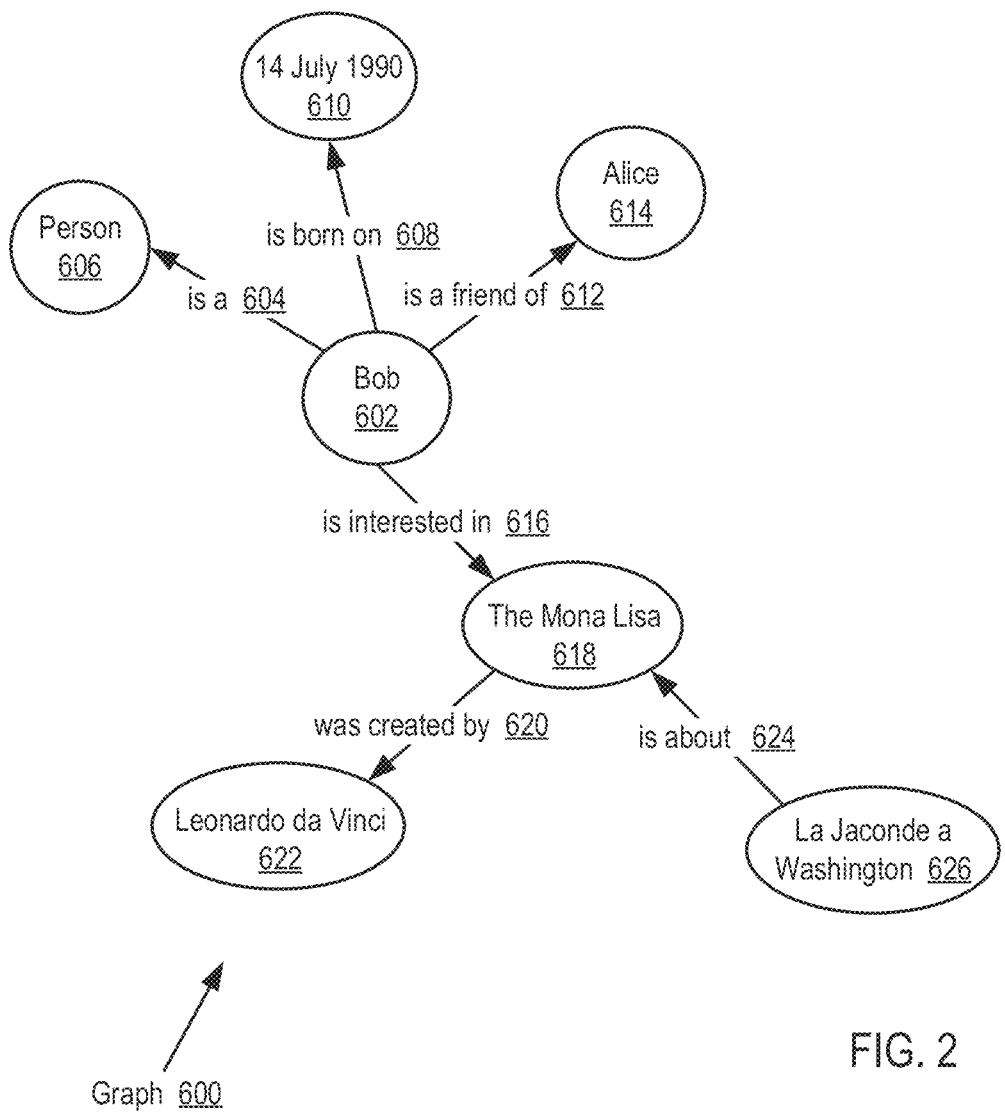
FIG. 2 sets forth a line drawing of an example graph of semantic triples useful in CRM according to embodiments of the present invention.

For further explanation of relations among triples and graphs, FIG. 2 sets forth a line drawing of a graph (600). The example graph of FIG. 2 implements in the form of a line drawing the example triple graph set forth above regarding Bob and the Mona Lisa. In the example of FIG. 2, the graph edges (604, 608, 612, 616, 620, 624) represent respectively relations among the nodes, that is, represent the predicates <is a>, <is a friend of>, <is born on>, <is interested in>, <was created by>, and <is about>. The nodes themselves represent the subjects (602, 618, 626) and objects (606, 610, 614, 618, 622) of the triples, <Bob>, <person>, <Alice>, <the $4^{th}$ of July 1990>, <the Mona Lisa>, <Leonardo da Vinci>, and <the video 'La Joconde á Washington'>. The node (618) representing the Mona Lisa is both a subject and an object. The node (618) representing the Mona Lisa is an object of the triple (602, 616, 618) that describes Bob's interest. The node (618) representing the Mona Lisa is a subject of the triple (618, 620, 622) that describes the Mona Lisa's creation by Leonardo.

In systems of knowledge representation, knowledge is represented in graphs of triples, including, for example, knowledge representations implemented in Gremlin, in Cypher, in Prolog databases, in Lisp data structures, or in RDF-oriented ontologies in RDFS, OWL, and other ontology languages. Search and inference are effected against such graphs by search engines configured to execute semantic queries and semantic inference in, for example, Gremlin, Cypher, Prolog, Lisp, or SPARQL.

Gremlin is a query language provided through the TinkerPop graph computing framework from the Apache Foundation. Cypher is an AI program that generates SPARQL queries from natural language input, allowing users to speak plain language to update and query databases; Cypher brings its own grammar and lexicon to natural language processing. SPARQL is a recursive acronym for "SPARQL Protocol and RDF Query Language." Lisp is a reliable, flexible programming language that is widely used in artificial intelligence, knowledge representation, and semantic applications. Prolog is a general-purpose logic programming language. Prolog supports queries against connected triples expressed as statements and rules in a Prolog database. SPARQL supports queries against ontologies expressed in RDFS, OWL, or other RDF-oriented ontologies. Regarding Prolog, SPARQL, Cypher, Gremlin, Lisp, and so on, these are examples of technologies explanatory of example embodiments of the present invention. Thus, such are not limitations of the present invention. Knowledge representations useful according to embodiments can take many forms in the art, now or in the future, and all such are now and will continue to be well within the scope of the present invention.

A description logic is a member of a family of formal knowledge representation languages. Some description logics are more expressive than propositional logic but less expressive than first-order logic. In contrast to first-order logics, reasoning problems for description logics are usually decidable. Efficient decision procedures therefore can be implemented for problem of search and inference in description logics. There are general, spatial, temporal, spatiotemporal, and fuzzy descriptions logics, and each description logic features a different balance between expressivity and reasoning complexity by supporting different sets of mathematical constructors.

Search queries are disposed along a scale of semantics. A traditional web search, for example, is disposed upon a zero point of that scale, no semantics, no structure. A traditional web search against the keyword "derivative" returns thousands of HTML documents discussing the literary concept of derivative works as well as calculus procedures. A traditional web search against the keyword "differential" returns many web pages describing automobile parts and many web pages discussing calculus functions.

Other queries are disposed along mid-points of the scale, some semantics, some structure, not entirely complete. This is actually a current trend in web search. Such systems may be termed executable rather than decidable. From some points of view, decidability is not a primary concern. In many Web applications, for example, data sets are huge, and they simply do not require a 100 percent correct model to analyze data that may have been spidered, scraped, and converted into structure by some heuristic program that itself is imperfect. People use Google because it can find good answers a lot of the time, even if it cannot find perfect answers all the time. In such rough-and-tumble search environments, provable correctness is not a key goal.

Other classes of queries are disposed where correctness of results is important, and decidability enters. A user who is a tele-agent in a data center speaking by phone with an automotive customer discussing a front differential is concerned not to be required to sort through calculus results to find correct terminology. Such a user needs correct definitions of automotive terms, and the user needs query results in conversational real time, that is, for example, within seconds.

In formal logic, a system is decidable if there exists a method such that, for every assertion that can be expressed in terms of the system, the method is capable of deciding whether or not the assertion is valid within the system. In practical terms, a query against a decidable description logic will not loop indefinitely, crash, fail to return an answer, or return a wrong answer. A decidable description logic supports data models or ontologies that are clear, unambiguous, and machine-processable. Undecidable systems do not. A decidable description logic supports algorithms by which a computer system can determine equivalence of classes defined in the logic. Undecidable systems do not. Decidable description logics can be implemented in C, C++, SQL, Lisp, RDF/RDFS/OWL, and so on. In the RDF space, subdivisions of OWL vary in decidability. Full OWL does not support decidability. OWL DL does.

Figure 3:
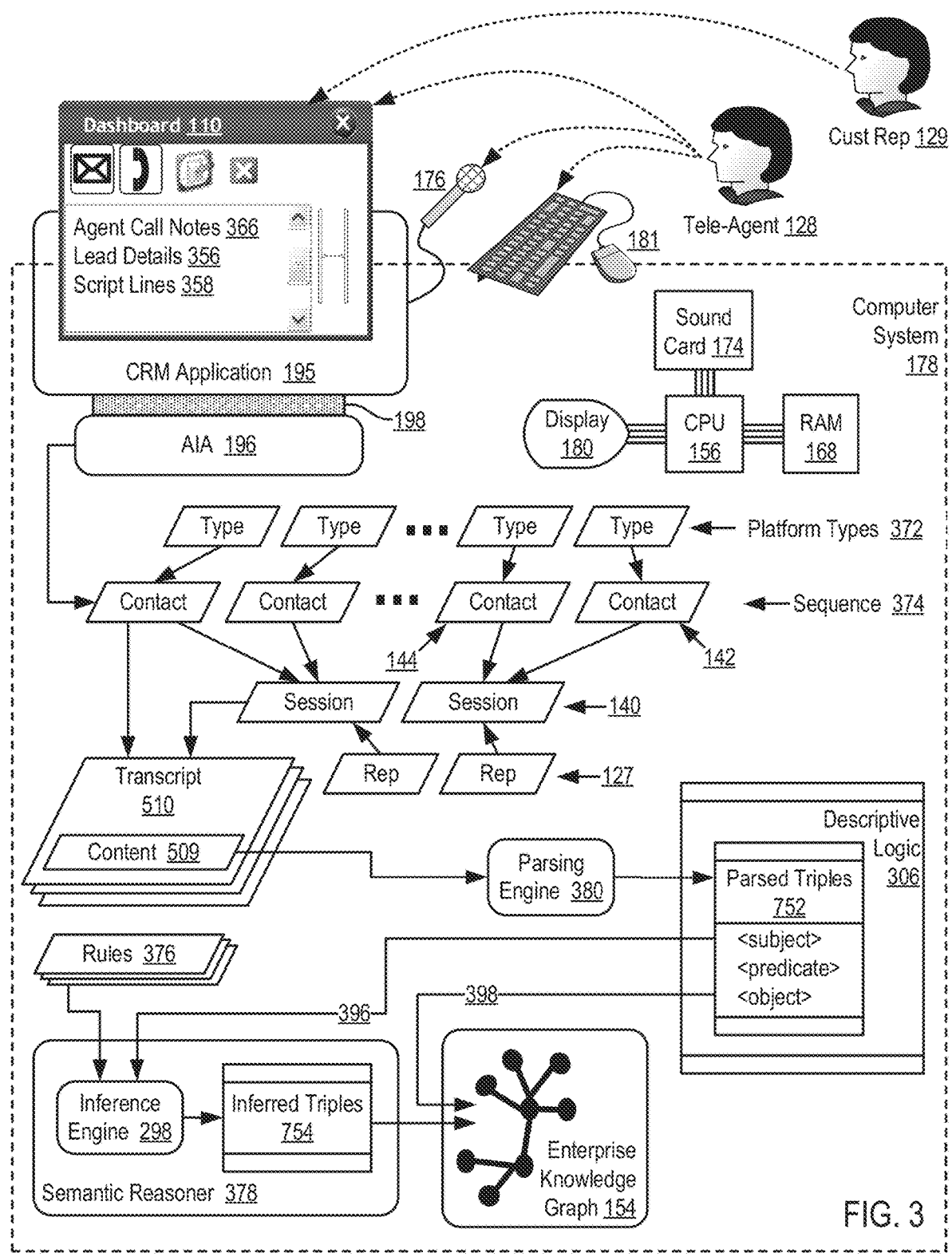
FIG. 3 sets forth a functional block diagram of an example computer system that implements CRM according to embodiments of the present invention.

For further explanation, FIG. 3 sets forth a functional block diagram of an example computer system (178) that implements CRM according to embodiments of the present invention. The example computer system of FIG. 3 includes a processor or "CPU" (156), random access memory or "RAM" (168), a sound card (174), and a display (180). The system includes a CRM application program (195), typically stored in RAM and executed on the CPU. The CRM application exposes through the display a graphical user interface or "GUI" in the form of a dashboard (110), which, by use of the sound card, audio equipment, keyboard, and mouse (181), in addition to the display (180), accepts and provides user I/O.

The overall example computer system illustrated in FIG. 3 operates generally to implement CRM according to embodiments of the present invention by administering by the computer system a communications session (140) that includes a sequence (374) of communications contacts (142, 144) between a tele-agent (128) and one or more customer representatives (129). The session (140) and each contact (374) composes a structure of computer memory (156, 168) of the computer system (178). The AIA (196) also carries out communications with the tele-agent (128) in support of the communications session (140). That is, the AIA communicates with both the tele-agent and the customer representative, in effect, on behalf of the CRM application and the overall computer system. In this example, it is said that the AIA (196) is an agent "of" the CRM application (195) because the AIA operates the CRM application through an application programming interface (198).

The example computer system illustrated in FIG. 3 is operated generally by the AIA (196) and the CRM application (195) to implement CRM according to embodiments of the present invention by establishing, upon a first communications contact (142) between a tele-agent (128) and a customer representative (129), as structure of computer memory (169) of the computer system, a communications session (140). In establishing a session, the AIA establishes, as structure of computer memory of the computer system, a session (140) as an object-oriented module of automated computing machinery whose structure and contents (509) are also stored as semantic triples (752, 754) in an enterprise knowledge graph (154). That is, a session in this example is established initially at least as an instance of an object-oriented session class. Establishing such a session includes storing in computer memory as member data elements of the session a subject code, a timestamp, identification of the tele-agent, identification of the customer representative, and optionally as well other information regarding the session.

The AIA also operates the system of FIG. 3 generally by administering through the communications session (140) across communications platforms a sequence (374) of communications contacts, including the first contact (142) and also subsequent communications contacts (144), between the tele-agent and the customer representative. The AIA administers a sequence (374) of contacts by establishing each contact as an object-oriented module of automated computing machinery that structures computer memory of the computer system and whose structure and contents are also stored as semantic triples in an enterprise knowledge graph. That is, a contact in this example is established initially at least as an instance of an object-oriented contact class. Administering a sequence of contacts includes recording in computer memory as member data elements of each contact a timestamp beginning the contact, duration of the contact, a session identifier for the contact, platform type, contact status, any communications content of the contact, and optionally as well other information regarding the contact.

The AIA (196) and the CRM application (195) in coordination with other components of the overall computer system in the example of FIG. 1 also operate generally by generating a digital transcript (510) of the content (509) of communications contacts (142, 144). The content (509) can include content from text messaging and email identified by author and content from telephone conversations identified by speaker. The AIA (196) and the CRM application (195) and the overall computer system in the example of FIG. 1 generate a transcript by gathering text content from contacts that effect communications by text messages and emails and by storing the gathered text content as semantic triples in an enterprise knowledge graph (154).

Also in the example of FIG. 3, generating a transcript can include capturing speech content (315) from telephone conversations (313) between a tele-agent (128) and a customer representative (129), recognizing the speech content into digitized text, and storing the digitized text as semantic triples in an enterprise knowledge graph (154). Similarly, generating a transcript can include storing speech content from telephone conversations between the tele-agent and the customer representative, that is, storing that content as captured audio recordings, and storing, as semantic triples in an enterprise knowledge graph, storage locations of the stored speech. Such storage locations can be expressed as URLs that identify the locations in cyberspace where the audio recording are stored. Generating a transcript can include identifying by voiceprint comparison the speakers in a conversation between the tele-agent and one or more customer representatives. Generating a transcript can include determining by voiceprint comparison during a telephone conversation between the tele-agent and a customer representative that the customer representative is unknown to the computer system, recording by the computer system a voiceprint for the unknown representative, identifying by the computer system, by prompt and response for an identification, the unknown representative, and recording, by the computer system in association with the recorded voiceprint, the identity of the now-identified representative.

The example system of FIG. 3 includes a parsing engine (380) that parses into parsed triples (752) of a description logic, the content (509) of the communications contacts. By the time the parsing engine takes charge of the content (509), in this example at least, the content has been organized in a transcript (510). For completeness of explanation, we mention also that the content can optionally also include content from one or more pertinent session objects (140). The example computer system of FIG. 3 also includes an inference engine (298) that infers from the parsed triples (752) according to inference rules (376) of an enterprise knowledge graph, inferred triples (754). The functions of the example computer system of FIG. 3 include storing (398) the parsed triples (752) and the inferred triples (754) in the enterprise knowledge graph (154) for use in CRM according to embodiments.

In the example of FIG. 3, the CRM application (195) at the behest of the AIA generates the sequence (374) of contacts (142, 144). A CRM contact is an activity that generates content, including digitized words for parsing (380) and inferencing (298) into triples (752, 754) that usefully can be included in an enterprise knowledge graph (154). Taken, for example, as instances of an object-oriented contact class, then, no doubt in addition to words, a CRM contact would also include member methods, other member data elements, and so on. Nevertheless, a CRM contact is basically a container or wrapper for content and structure (509) for parsing and inference. Examples of CRM content includes words describing new customers, new customer representatives, new call notes, triples newly constructed by a user with GUI widgets, and so on. A CRM contact can be scoped by user input, as, for example, activation of a button widget on a dashboard designating a contact.

In this example, the inference engine (298) operates in the context of a semantic reasoner (378). A semantic reasoner is a module of automation that expands an inference engine with enriched functionality. In this paper, it is generally assumed that query execution and inferencing are carried out by the same engine, a query and inference engine, often referred to simply as an inference engine. It is possible to configure a query engine separate from an inference engine, but for ease of explanation, in this paper, the query function and the inference function are combined in an "inference engine." With a reasoner, the functionality of the inference engine can be limited to query execution and inferencing. Additional functionality associated with queries and inferencing is provided by the semantic reasoner. Examples of such additional functionality include inserting parsed triples and inferred triples into an enterprise knowledge base, storing parsed or inferred triples as a separate graph for further processing, storing parsed and inferred triples into a new separate dataset such as for publication, serializing parsed and inferred triples for saving to a file, displaying parsed and inferred triples for administration by a user, and so on.

Figure 4:
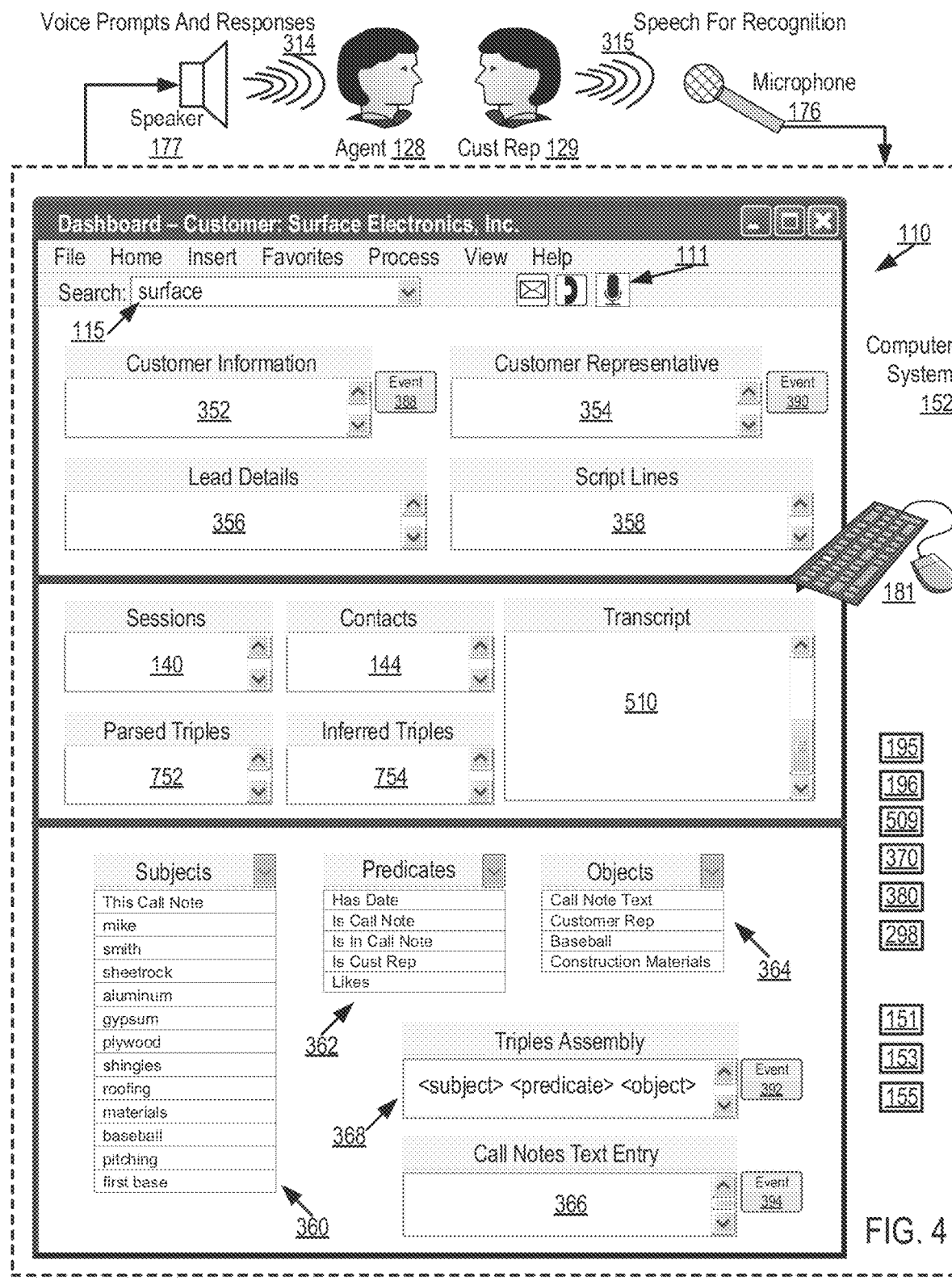
FIG. 4 sets forth a line drawing of an example dashboard adapted for CRM according to embodiments of the present invention.

For further explanation, FIG. 4 sets forth a line drawing of an example dashboard (110) adapted to implement CRM according to embodiments of the present invention. The dashboard is a graphical user interface ('GUI') of a computer system (152). The dashboard itself is a GUI exposed by a speech-enabled CRM application, and at least optionally operated by an AIA, that provides to a tele-agent a front-end, an interface, for all pertinent functionality of a contact center, leads, scripts, enterprise knowledge base, triple servers with semantic CRM stores, customer information, information on customer representatives, call notes stores, voice services, communications sessions, communications contacts, functionality of an AIA, transcripts of the content of contacts, and so on, and so on.

The dashboard implements digital controls called widgets. A widget is a GUI element of interaction, such as a button or a scroll bar. Widgets are automated elements with which a user interacts with through direct manipulation to read or edit information or administer control. Each widget appears as a digital part of a GUI and facilitates a specific type of user-computer interaction. Some widgets support interaction with the user, for example, labels, buttons, and check boxes. Others act as containers that group widgets added to them, for example, windows, panels, and tabs. Examples of widgets optionally useful in CRM controls according to embodiment include buttons, radio buttons, check boxes, sliders, list boxes, spinners, drop-down lists, menus, menu bars, scroll bars, text boxes, dialog boxes, and so on.

In the example of FIG. 4, by use of a search widget (115), the dashboard has been navigated to point to customer information for a customer named Surface Electronics, Inc. The Customer Information scroll box widget (352) will display customer information such as address, web page link, email, telephones, and so on. Similarly, the Customer Representative scroll box widget (354) will display identities, contact information, and other information for each customer representative of Surface Electronics, Inc., that has had contact with a tele-agent.

In the example of FIG. 4, the dashboard at the behest of an AIA generates communications sessions (140) and contacts (144) and hands them off to a parsing engine (380) and an inference engine (298) for further processing, including displaying results (752, 754) of such processing in support of CRM operations by user tele-agents. The dashboard accepts user inputs of words of text as content (509) describing a phone call between a tele-agent (128) and a customer representative (129) through call notes text entry scrolling text box widget (366), and, when an event widget button (394) is invoked, the dashboard gathers into a CRM contact (374) the input words describing the phone call, generates a digital transcript (510) of the content of the communications contact, and passes the content to a parsing engine (380). The dashboard accepts user inputs of words of text as content (509) of email, text messages, and speech recognized and recorded from phone calls. Thus, a sequence of user operations of the GUI generates a sequence of contacts with content for processing into transcripts and processing by a parsing engine and an inference engine into parsed triples (752) and inferred triples (754). A parsing engine (380) and an inference engine (298) of the computer system (152) process the structure and content (509) of sessions (140) and contacts (144) and display on the dashboard (110) in scrolling text box widgets the resulting parsed triples (752) and inferred triples (754).

The dashboard in the example of FIG. 4 functions in several ways to acquire content that is gathered into communications sessions (140), contacts (144), and transcripts (510) for parsing and inference. In a first alternative way of providing digitized content (509) to the parsing engine (298), the dashboard through a speech engine (153) recognizes words into digitized speech from a conversation between a tele-agent (128) and a customer representative (129). In this example method, recognizing speech from such a conversation is carried out as follows. Words of speech from the conversation (313) travel through a microphone (176) and amplifier of the computer (152) and, in a thin-client architecture, through a VOIP connection to a voice server (151) where a speech recognition engine recognizes the words into a stream of digitized speech which is handed off to a natural language processing ("NLP") engine which processes the digitized speech into sentences and parts of speech and passes the words so processed (509) to the AIA (196) or the CRM application (195) where they generate a transcript and to the parsing engine (298) where they are parsed into triples (752). This is a first alternative way in which the dashboard provides content for inclusion in contacts and transcripts.

In a second alternative way of providing digitized content, the dashboard gathers into a contact the content of call notes from a text box widget (366). The tele-agent, rather than speaking words as content of a contact, types call notes into a text box widget (366), and the text so typed is provided by the dashboard as digitized content of a contact to a natural language processing engine (155). The natural language processing engine sees no difference between typed words from the text box (366) and the words in a stream of digitized speech from a spoken conversation. Thus, this second alternative is similar to the first alternative with the exception that there is no need for speech recognition, because when a stream of digitized text arrives in the speech engine (153), the words in the stream are already digitized by typing them in through the text box (366). The natural language processing engine (155) works the same way as in the first alternative, processing the digitized text from the text box (366) into sentences and parts of speech and passing the words so processed (509) to the AIA (196) and the CRM application (195) who generate a transcript and to the parsing engine (298) where they are parsed into triples (752). This is a second alternative way in which the dashboard provides content for inclusion in CRM contacts and transcripts.

In a third alternative way of providing digitized words, the dashboard passes to the AIA, the CRM application, and the parsing engine words designated as elements of triples through widgets (360, 362, 364) of the dashboard. These widgets are pull-down menu listings of Subjects for triples (360), Predicates for triples (362), and Objects (364) for triples. The Predicates (362) and Objects (364) usually are triple elements already defined in an ontology supportive of a semantic CRM triple store portion of an enterprise knowledge graph. The Subjects (360) are a stream of text word candidates for inclusion in triples. Text in the Subjects pull-down menu (360) is provided by the speech engine (153) from call notes text (366) or from words recognized from a conversation (313) or otherwise. The tele-agent (128) designates content (509) for inclusion in a contact by selecting text from the Subjects pull-down menu (360), for example, selecting by keyboard or mouse (181). The tele-agent can select text from the pull-down (360) by double-click or by drag-and-drop onto the assembly box (368) for triples. The tele-agent can optionally also select a Predicate (362) or an Object (364) for inclusion in the same triple with the selected Subject, also by double-click or drag-and-drop. The dashboard can drop the tele-agent's selections directly into a transcript (510). The tele-agent's selections of predicates and objects in some embodiments also can be binding upon the parsing engine. In other embodiments, the tele-agent's selections are treated by the parsing engine merely as recommendations. The parsing engine (298) optionally accepts the tele-agent's selections of predicates and objects, or the parsing process makes its own selections of predicates and triples for inclusion with a word in at least one parsed triple (752). This is a third alternative way in which the dashboard provides content for inclusion in CRM contacts and transcripts.

Figure 5:
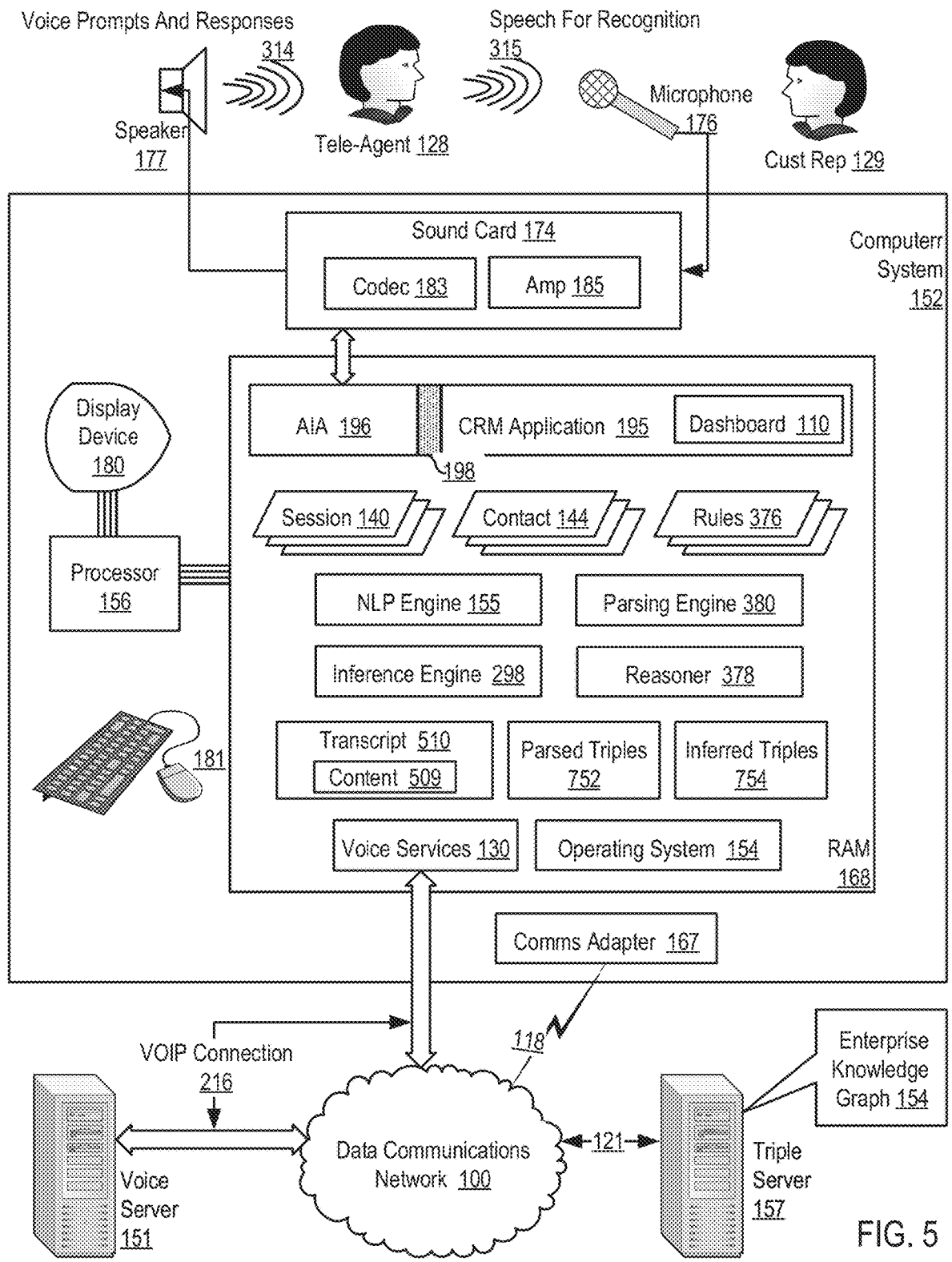
FIG. 5 sets forth a functional block diagram of example apparatus for CRM in a thin-client architecture according to embodiments of the present invention.

For further explanation, FIG. 5 sets forth a functional block diagram of example apparatus for CRM in a thin-client architecture according to embodiments of the present invention. A thin-client architecture is a client-server architecture in which at least some of, in some embodiments most of, in some embodiments all of, speech processing and triple processing is off-loaded from the client to servers. Thinness of thin-clients varies. The computer (152) in the example of FIG. 5 is a thin client in which most speech processing is off-loaded to a voice server (151). The computer (152) accepts voice input (315, 174), but then transfers the voice input through a VOIP connection (216) to the voice server (151) where all speech processing is performed. The speech-enabled device in this example does implement some capacity for triple processing, a natural language processing engine (155), a parsing engine (380), and an inference engine (298), but most of that is optional architecture in a thin client. Devices with reduced storage capacity, a smartwatch or a mobile phone for example, can be implemented with no natural language processing engine (155), no parsing engine (380), and no inference engine (298), merely passing CRM content (509) through to a triple server (157) that itself carries out all parsing and inferencing.

In the particular example of FIG. 5, the computer (152) occupies a middle ground of thin-client architecture. It supports little or no speech processing, but it does support some triple processing. The thin-client computer in this example performs parsing and inferencing only into triple stores (752, 754) in RAM (168), leaving large-scale storage to the triple server (157). The semantic reasoner (378) loads from storage on the triple server (157) previously stored asserted triples as needed to support inference and CRM functions. This is a compromise between an extremely thin client with no triple storage at all and the thick client described below with regard to FIG. 9.

The example apparatus of FIG. 5 includes the computer (152) and a voice server (151) connected for data communication by a VOIP connection (216) through a data communications network (100). A dashboard (110) runs on the speech-enabled device (152), and in this example, the dashboard (110) is a speech-enabled application that operates user I/O by voice (315), by GUI on a display (180), by keyboard and mouse (181), and so on. A CRM application (195) operates the dashboard as a user interface, and the CRM application may be implemented as a set or sequence of X+V or SALT documents that execute on a speech-enabled browser, a Java Voice application that executes on a Java Virtual Machine, or a speech-enabled application implemented in other technologies. The CRM application (195) in this example is operated through API (198) by AIA (196). The example computer of FIG. 5 includes a sound card (174), which is an example of an I/O adapter specially designed for accepting analog audio signals from a microphone (176) and converting the audio analog signals to digital form for further processing by a codec (183).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols may be used to effect VOIP, including, for example, types of VOIP effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The AIA (196) and the CRM application (195) in this example are user-level, speech-enabled, client-side computer programs that presents a voice interface to user (128), provide audio prompts and responses (314) and accept input speech for recognition (315). The AIA and the CRM application (195) provide a speech interface through which a user may provide oral speech for recognition through microphone (176) and have the speech digitized through an audio amplifier (185) and a coder/decoder ('codec') (183) of a sound card (174) and provided for recognition to a voice server (151). Speech-enabled application (195) packages digitized speech in recognition request messages according to a VOIP protocol, and transmits the speech to voice server (151) through the VOIP connection (216) on the network (100).

The voice server (151) provides voice recognition services for speech-enabled devices by accepting dialog instructions, VoiceXML segments, or the like, and returning speech recognition results, including text representing recognized speech, text for use as variable values in dialogs, and output from execution of semantic interpretation scripts as well as voice prompts. Voice server (151) includes computer programs that provide text-to-speech ('TTS') conversion for voice prompts and voice responses to user input in speech-enabled applications such as, for example, X+V applications, SALT applications, Java Speech applications, or the like.

The computer (152) in the example of FIG. 5 includes a semantic query and inference engine (298), a module of automated computing machinery that accepts from the CRM application (195) and the dashboard (110) and executes against parsed triples (752) semantic queries and inferences according to semantic rules of inference (376). In this paper, the query and inference engine is often called, for ease of reference, merely an inference engine. But the longer name is appropriate, because instructions for inference in many embodiments, particularly those that implement RDF/RDGS/OWL ontologies for triples and SPARQL for queries, are expressed as components of SPARQL queries, and in such embodiments, inference rules (376) can be, and often are, expressed as elements of semantic queries. In such embodiments, the CRM application (195) formulates semantic queries with user input through the dashboard from speech (315), GUI (110), keyboard or mouse (181), or the like. Such a semantic query is a query designed and implemented against structured data. Semantic queries utilize logical operators, namespaces, pattern matching, subclassing, transitive relations, semantic rules and contextual full text search. Semantic queries work on named graphs, linked-data, or triples. In embodiments of the present invention, linked triples typically form graphs. Data so structured enables a semantic query to process actual relationships between items of information and infer answers from a structured network of data. Semantic queries contrast with semantic search, which attempts with various levels of success to use semantics in unstructured text to improve meaning of search results.

Example formulations of semantic queries are had in C, C++, Java, Prolog, Lisp, and so on. The semantic web technology stack of the W3C is an example formulation that offers SPARQL to effect semantic queries in a syntax similar to SQL. Semantic queries are used against data structured in triple stores, graph databases, semantic wikis, natural language, and artificial intelligence systems. As mentioned, semantic queries work on structured data, and in the particular examples of the present case, the structured data is words, including literal phrases and names identified in URIs, described and defined in semantic triples connected in ways that conform to a formal logic, sometimes a predicate logic, often a description logic. In many embodiments of the present invention, semantic queries are asserted against data structured according to a description logic that implements decidability.

In the example apparatus of FIG. 5, the computer (152) is coupled for data communication through a communications adapter (167), wireless connection (118), data communications network (100), and wireline connection (121) to a triple server (157). The triple server (157) provides large volume backup for triple stores. The triple server is a configuration of automated computing machinery that serializes triples and stores serialized triples in relational databases, tables, files, or the like. The triple server retrieves as needed from non-volatile storage such serialized triples, parses the serialized triples into triple subgraphs, and provides such triple subgraphs upon request to thin-client computers and other devices for use in systems that utilize the triples in CRM according to embodiments of the present invention.

The overall example computer system illustrated in FIG. 5 operates generally to implement CRM according to embodiments of the present invention by administering by the computer system a communications session (140) that includes a sequence of communications contacts (144) between a tele-agent (128) and one or more customer representatives (129). The session (140) and each contact (144) compose a structure of computer memory (156, 168) of the computer system (178). The AIA (196) carries out communications with the tele-agent (128) in support of the communications session (140). The computer system establishes, as structure of computer memory of the computer system, a session (140) as an object-oriented module of automated computing machinery whose structure and contents (509) in some embodiments are also stored as semantic triples (752, 754) in an enterprise knowledge graph (154). That is, a session in this example is established initially at least as an instance of an object-oriented session class. Establishing such a session includes storing in computer memory as member data elements of the session a subject code, a timestamp, identification of the tele-agent, identification of the customer representative, and optionally as well other information regarding the session.

The computer system administers a sequence of contacts by establishing each contact as an object-oriented module of automated computing machinery that structures computer memory (168) of the computer system and whose content (509) is gathered into a transcript (510) and also stored as semantic triples in an enterprise knowledge graph (154). That is, a contact (144) in this example is established initially at least as an instance of an object-oriented contact class. Administering a sequence of contacts includes recording in computer memory as member data elements of each contact a timestamp beginning the contact, duration of the contact, a session identifier for the contact, platform type, contact status, any communications content of the contact, and optionally as well other information regarding the contact.

The operations of the AIA (196) and the CRM application (195) in coordination with other components of the overall computer system in the example of FIG. 5 include generating a digital transcript (510) of the content (509) of communications contacts (142, 144). The content (509) can include content from text messaging and email identified by author and content from telephone conversations identified by speaker. The AIA (196) and the CRM application (195) and the overall computer system in the example of FIG. 1 generate a transcript by gathering text content from contacts that effect communications by text messages and emails and by storing the gathered text content as semantic triples in an enterprise knowledge graph (154).

Effecting CRM according to embodiments of the present invention, particularly in a thin-client architecture, may be implemented with one or more voice servers. A voice server is a computer, that is, automated computing machinery, that provides speech recognition and speech synthesis. For further explanation, FIG. 6 sets forth a block diagram of automated computing machinery representing an example voice server (151) supportive of CRM with a client computer according to embodiments of the present invention. The voice server (151) of FIG. 6 includes at least one computer processor (156) or 'CPU' as well as random access memory (168) ('RAM') which is connected through a high-speed memory bus (166) and bus adapter (158) to the CPU (156) and to other components of the voice server.

Stored in RAM (168) is a voice server application (188), a module of automation capable of operating a voice server in a system that is configured for use in CRM according to embodiments of the present invention. Voice server application (188) provides voice recognition services for speech-enabled client devices by accepting requests for speech recognition and returning speech recognition results, including text representing recognized speech, text for use as variable values in dialogs, and text as string representations of scripts for semantic interpretation. Voice server application (188) also includes the capability to provide text-to-speech ('TTS') conversion for voice prompts and voice responses to user input in speech-enabled client-side applications such as, for example, speech-enabled browsers, X+V applications, SALT applications, Java Speech applications, and the like.

Voice server application (188) may be implemented as a web server, implemented in Java, C++, Python, Perl, or any language that supports X+V, SALT, VoiceXML, or other speech-enabled languages, by providing responses to HTTP requests from X+V clients, SALT clients, Java Speech clients, or other speech-enabled client devices. Voice server application (188) may, for a further example, be implemented as a Java server that runs on a Java Virtual Machine (102) and supports a Java voice framework by providing responses to HTTP requests from Java client applications running on speech-enabled devices. And voice server applications that support embodiments of the present invention may be implemented in various other ways, and all such ways are well within the scope of the present invention.

The voice server (151) in this example includes a natural language processing speech recognition ("NLP-SR") engine (153). An NLP-SR engine is sometimes referred to in this paper simply as a 'speech engine.' A speech engine is a functional module, typically a software module, although it may include specialized hardware also, that does the work of recognizing and generating human speech. In this example, the speech engine (153) is a natural language processing speech engine that includes a natural language processing ("NLP") engine (155). The NLP engine accepts recognized speech from an automated speech recognition ('ASR') engine, processes the recognized speech into parts of speech, subjects, predicates, objects, and so on, and then makes such parts available to parsing engines for conversion into semantic triples for further inference and for inclusion in triple stores.

The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates speech feature vectors ('SFVs') with phonemes representing pronunciations of words in a human language. The lexicon (106) is an association of words in text form with phonemes representing pronunciations of each word; the lexicon effectively identifies words that are capable of recognition by an ASR engine. Also stored in RAM (168) is a Text-To-Speech ('TTS') Engine (194), a module of computer program instructions that accepts text as input and returns the same text in the form of digitally encoded speech, for use in providing speech as prompts for and responses to users of speech-enabled systems.

The grammar (104) communicates to the ASR engine (150) the words and sequences of words that currently may be recognized. For further explanation, distinguish the purpose of the grammar and the purpose of the lexicon. The lexicon associates with phonemes all the words that the ASR engine can recognize. The grammar communicates the words currently eligible for recognition. The two sets at any particular time typically are not the same.

Grammars may be expressed in a number of formats supported by ASR engines, including, for example, the Java Speech Grammar Format (JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
  # JSGF V1.0;
  grammar command;
  <command>=[remind me to] call|phone|telephone
     <name> <when>;
  <name>=bob|martha|joe|pete|chris|john|artoush;
  <when>=today|this afternoon|tomorrow|next week;
  ]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars 'I' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole matches utterances like these:

"phone bob next week,"
"telephone martha this afternoon,"
"remind me to call chris tomorrow," and
"remind me to phone pete today."

The voice server application (188) in this example is configured to receive, from a speech-enabled client device located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a speech feature vector or SFV. An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on speech-enabled devices, from X+V clients running remotely on speech-enabled devices, from SALT clients running on speech-enabled devices, from Java client applications running remotely on multimedia devices, and so on. In this example, VoiceXML interpreter (192) interprets and executes VoiceXML segments representing voice dialog instructions received from remote speech-enabled devices and provided to VoiceXML interpreter (192) through voice server application (188).

A speech-enabled application like a client-side CRM application (195 on FIG. 5) or a dashboard (110 on FIG. 5) in a thin-client architecture may provide voice dialog instructions, VoiceXML segments, VoiceXML <form> elements, and the like, to VoiceXML interpreter (149) through data communications across a network with such a speech-enabled application. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA') (193). The VoiceXML interpreter interprets VoiceXML dialogs provided to the VoiceXML interpreter by a speech-enabled application.

As mentioned, a Form Interpretation Algorithm (TIA') drives the interaction between a user and a speech-enabled application. The FIA is generally responsible for selecting and playing one or more speech prompts, collecting a user input, either a response that fills in one or more input items, or a throwing of some event, and interpreting actions that pertained to the newly filled-in input items. The FIA also handles speech-enabled application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 6 are shown in RAM (168), but many components of such software typically are stored in non-volatile memory also, for example, on a disk drive (170).

Figure 6:
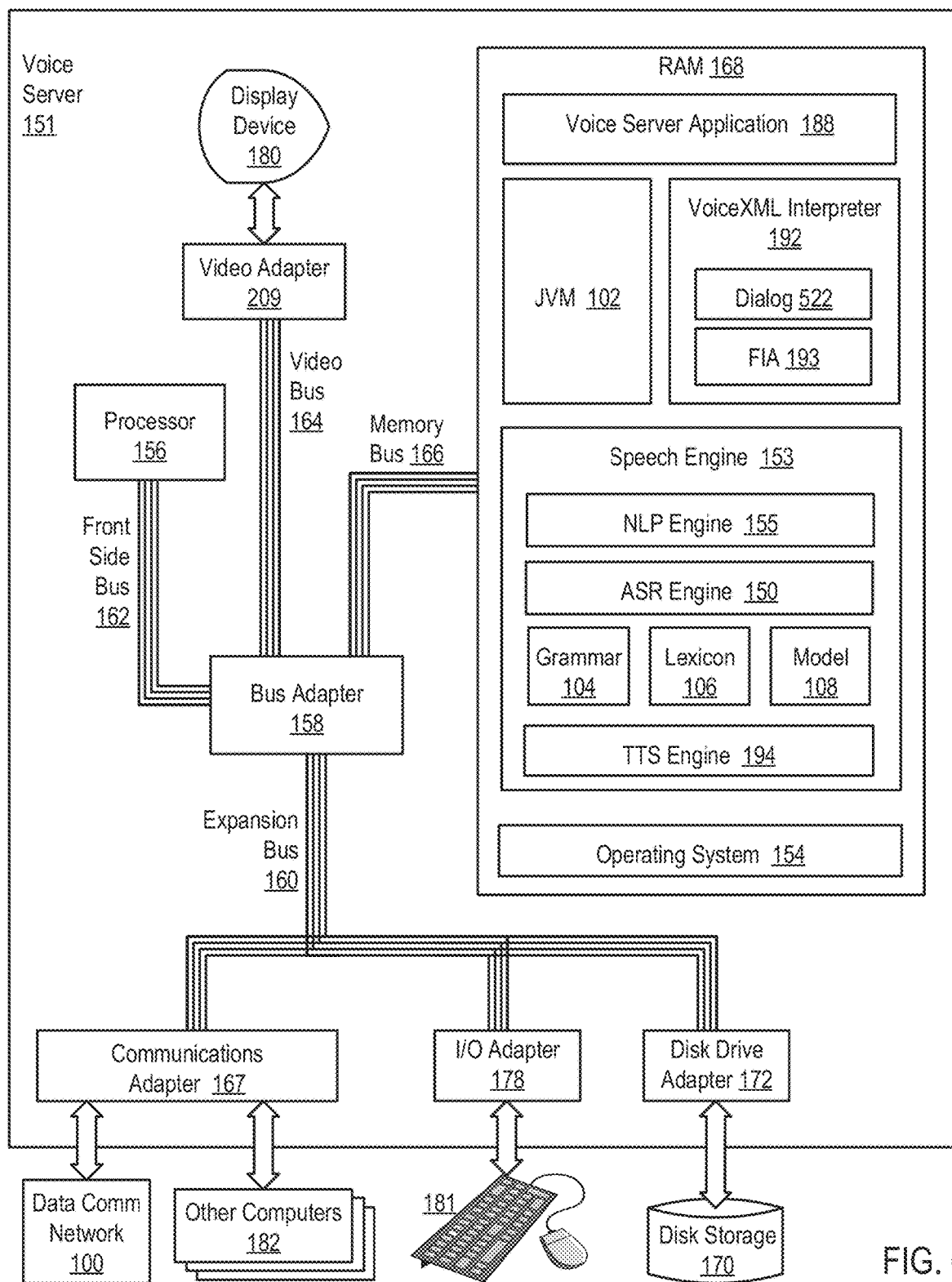
FIG. 6 sets forth a block diagram of an example computer useful as a voice server for CRM according to embodiments of the present invention.

The example voice server (151) of FIG. 6 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 6 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics (IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 6 includes one or more input/output (I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 6 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The example voice server (151) of FIG. 6 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications network communications, and 802.11 adapters for wireless data communications network communications.

Figure 7:
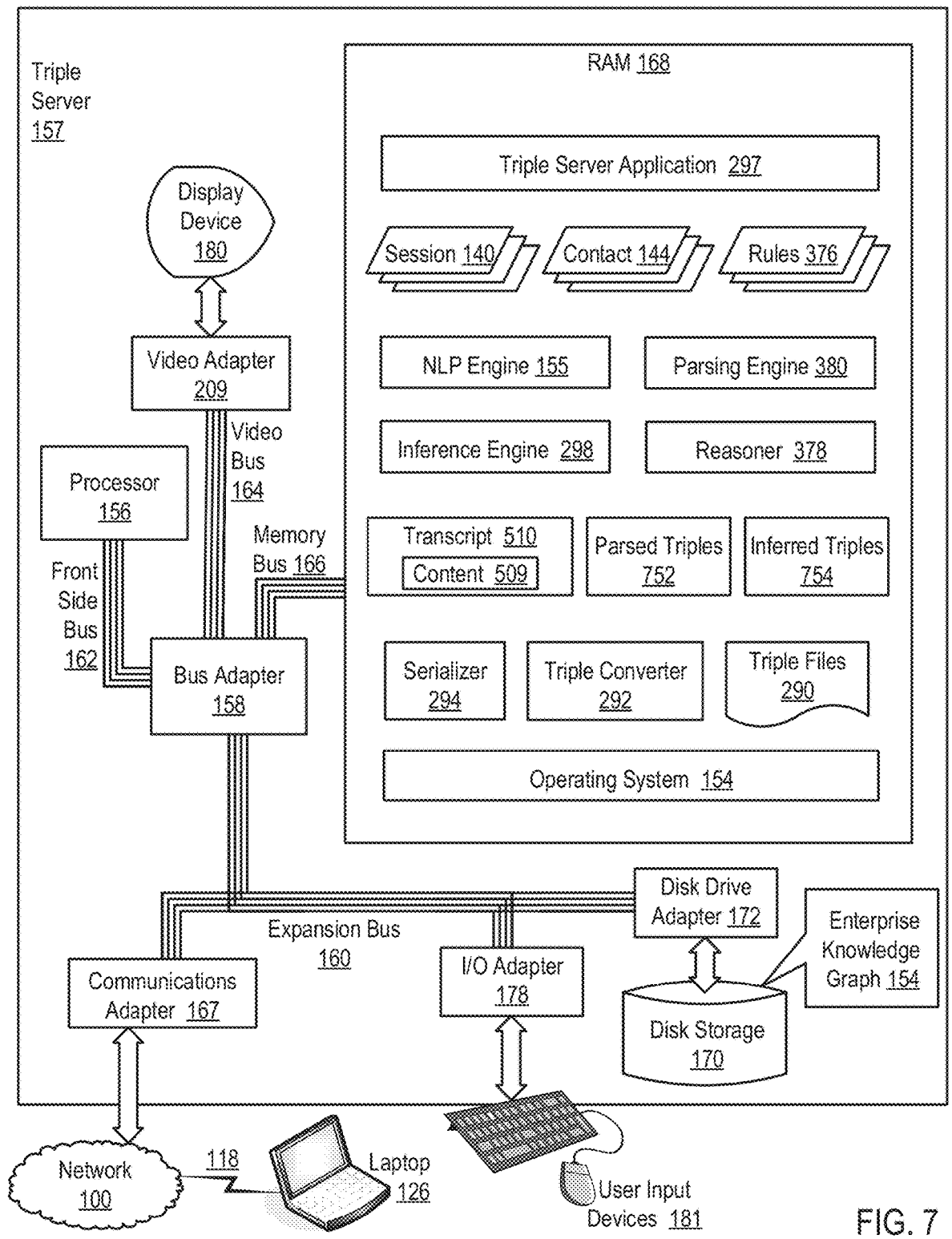
FIG. 7 sets forth a block diagram of an example computer useful as a triple server for CRM according to embodiments of the present invention.

For further explanation, FIG. 7 sets forth a block diagram of automated computing machinery comprising an example of a computer useful as a triple server (157) for CRM according to embodiments of the present invention. The triple server (157) of FIG. 7 includes at least one computer processor (156) or 'CPU' as well as random access memory (168) ('RAM') which is connected through a high-speed memory bus (166) and bus adapter (158) to processor (156) and to other components of the triple server. The processor is connected through a video bus (164) to a video adapter (209) and a computer display (180). The processor is connected through an expansion bus (160) to a communications adapter (167), an I/O adapter (178), and a disk drive adapter (172). The processor is connected to a speech-enabled laptop (126) through data communications network (100) and wireless connection (118). Disposed in RAM is an operating system (154).

Also disposed in RAM are a triple server application program (297), data communications sessions (140), data communications contacts (144), structure and content (509) of sessions and contacts, inference rules (376), a natural language processing ("NLP") engine (155), a parsing engine (380), an inference engine (298), and a semantic reasoner (378). Also disposed in RAM are a triple serializer (294), a triple converter (292), and one or more triple files (290).

The triple server application program (297) accepts, through network (100) from client-side devices such as laptop (126), instances of sessions (140), contacts (144), and transcripts (510) from which it extracts content (509) for parsing. To the extent that content (509) is gathered into transcripts (510) on the client side (126), such embodiments may not provide sessions (140) and contacts (144) as such to the triple server (157). The NLP engine optionally eases the parsing process by first processing at least some content into sentences and parts of speech before providing the content so processed to the parsing engine. The parsing engine parses the content into parsed triples (752). The inference engine (298) takes as inputs the parsed triples (752) and a set of inference rules (376) and infers inferred triples (754). The triple server application (297) then returns copies of the parsed triples and inferred triples to the client side for further processing and stores the parsed triples and inferred triples in the enterprise knowledge graph (154). In this way, the triple server offloads from the client device (126) most of the triple-related processing and storage data processing workload.

The serializer (294) administers the transfer of triples between triple stores (750, 752, 754) in RAM and various forms of disk storage or other non-volatile storage. The serializer (294) accepts as inputs the contents of triple stores and serializes them for output as triple files (290), tables, relational database records, spreadsheets, text documents, or the like, for long-term storage in non-volatile memory, such as, for example, on a hard disk (170). The serializer (294) accepts triple files (290) as inputs and outputs parsed triples into triple stores in RAM. In many embodiments, when the serializer (294) accepts triple files (290) as inputs and outputs parsed triples into triple stores in RAM, the serializer stores the output triple stores into contiguous segments of memory. Contiguous storage can be effected in the C programming language by a call to the malloc( ) function. Contiguous storage can be effected by the Python buffer protocol. Contiguous storage can be effected in other ways as will occur to those of skill in the art, and all such ways are within the scope of the present invention. In many embodiments, triple stores (750, 752, and 754) would be stored in segments of contiguous memory.

Figure 8:
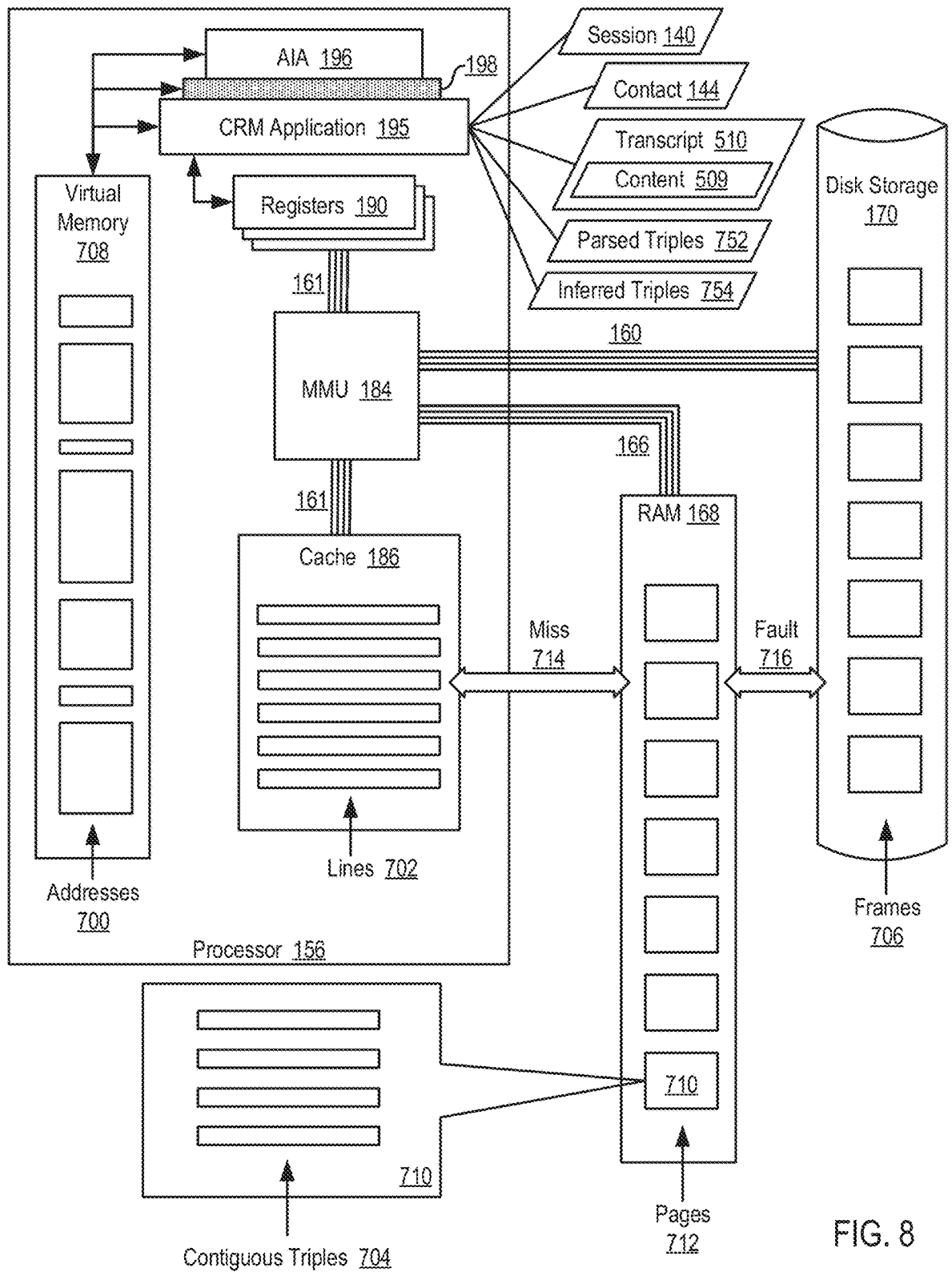
FIG. 8 sets forth a block diagram of an example computer memory system useful for CRM according to embodiments of the present invention.

Contiguous memory is explained in more detail with reference to FIG. 8. FIG. 8 sets forth a block diagram of a computer memory system, configured supportive of CRM according to embodiments, that includes a computer processor (156) composed of various registers (190) executing a CRM application (195), an API (198), and an AIA (196). The CRM application (195), the API (198), the AIA (196), the registers (190) of the processor, as well as all attendant conformations of memory, data communications sessions (140), communications contacts (144), transcripts (510) content (509) of contacts, parsed triples (752), inferred triples (754), and so on, all operate with memory addresses (700) disposed in virtual memory (708). The contents of virtual memory are backed up with physical storage in an on-processor cache (186), RAM (168), and disk (170). The contents of the cache are organized in cache lines (702). Memory in RAM is organized in pages (712). Memory on disk is organized in frames (706). A memory management unit ("MMU") (184) translates virtual memory addresses into physical memory locations and moves contents of memory from physical storage to and from processor registers. In accessing physical memory, the MMU always looks first in the cache. A failure to find content in the cache is termed a "cache miss" (714). Upon a cache miss, the MMU seeks memory content in RAM (168) and moves it into the cache. Failing to find sought content in RAM, a failure termed a "page fault" (716), the MMU looks all the way out to the page frames (706) on disk, moves content into RAM (168) and then into cache (186).

The use of contiguous memory deals with a particular challenge in memory management for CRM. In typical embodiments, cache access takes 10 nanoseconds. RAM access takes 100 nanoseconds. Disk access takes 10,000,000 nanoseconds. Those numbers are not intuitive, because people do not experience time in nanoseconds. Let us therefore look at this challenge in more familiar terms. If cache access is viewed as taking one minute, then RAM access takes 10 minutes, and disk access for the same data takes two years. Triples scattered across virtual memory addresses risk being stored in multiple page frames. Triples stored near one another in a contiguous memory segment are much more likely to be stored in a small number of page frames.

Suppose a pertinent set of triples, a subgraph of triples, for example, parsed, inferred, or previously asserts and stored, is composed of 10 kilobytes of storage. Some computer systems today support memory page sizes of a megabyte or more. Such a set of triples (704) can be stored in a single memory page (710), and, once that page is in RAM (168), operation of the triple set for CRM can proceed with no risk of page faults at all. Even if contiguous storage for such a set falls across a page boundary, the entire set of triples can still be loaded with only two page faults, and, after it is loaded into RAM, it can be operated with zero page faults going forward. Cache misses would still be required to load the contents into cache, but, except for the first one or two misses, none of the others would risk a page fault. The inventors estimate that after a short period of operation, the cache miss rate would be less than one percent for operation of such a set of triples in the context of CRM. That is, when a set of triples is disposed in contiguous memory in support of CRM according to embodiments of the present invention, memory access times generally will approximate cache access times, just a few nanoseconds, for more than 99% of memory access.

Figure 9:
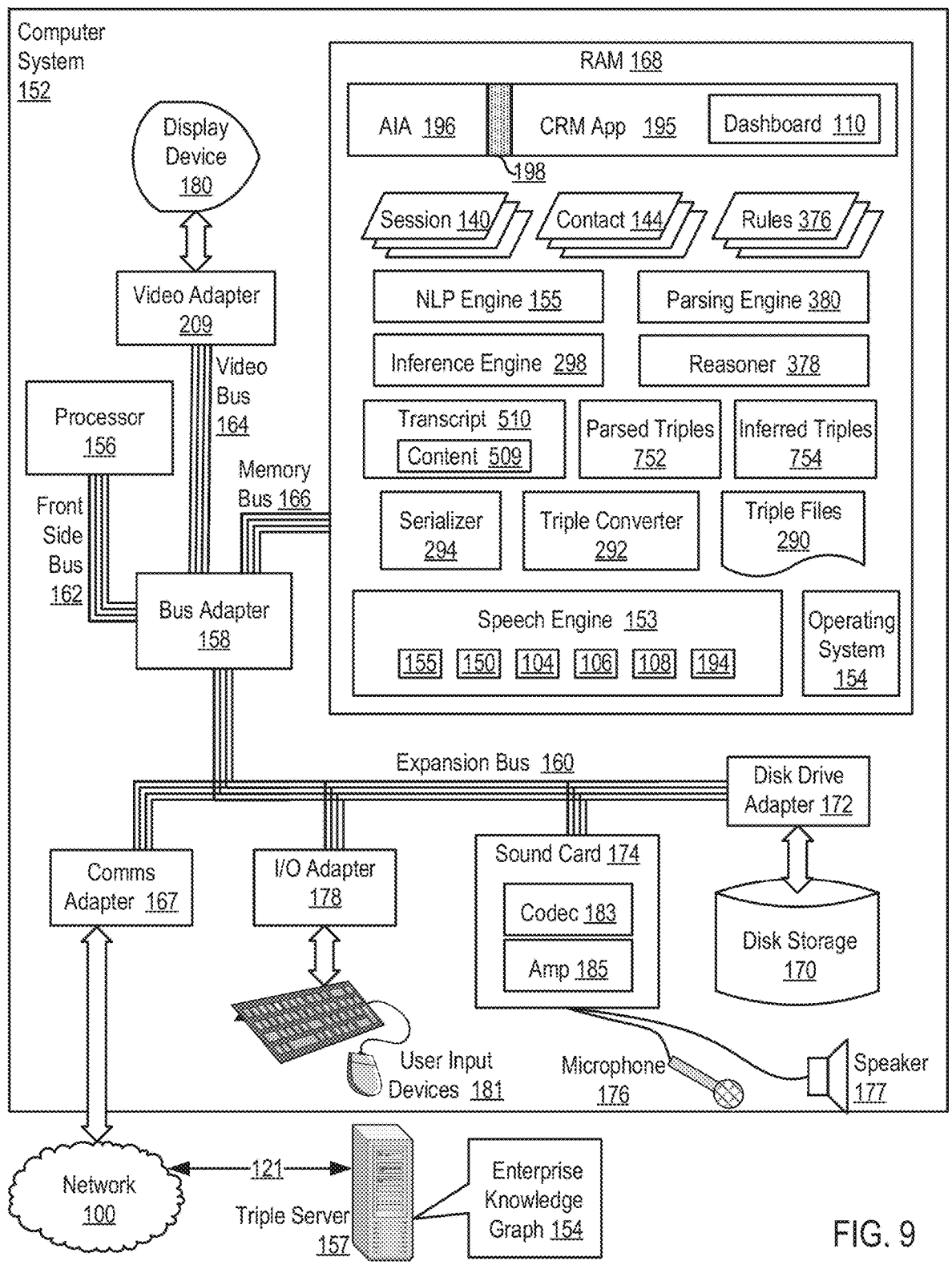
FIG. 9 sets forth a functional block diagram of example apparatus for CRM in a thick-client architecture according to embodiments of the present invention.

For further explanation, FIG. 9 sets forth a functional block diagram of example apparatus, a speech-enabled device for CRM, in a thick-client architecture according to embodiments of the present invention. A thick-client architecture is a client-server architecture in which all or most of the functionality required to administer CRM according to embodiments is supported directly on client-side devices rather than on servers. Servers are used for backup and synchronization rather than session administration, contact administration, speech recognition, semantic queries, or inferencing. A thick client requires resources, processor power and memory storage, possibly not always available on a small device such as a smartwatch or a mobile phone. In a thick client with sufficient data processing resources, however, all pertinent functionality, communications sessions, communications contacts, parsing, inference rules, inferencing, triple stores, speech processing, and so on, typically are immediately and fully useful, regardless of network availability. The thick-client speech-enabled computer (152) in the example of FIG. 9 is automated computer machinery that includes a CPU (156), RAM (168), data buses (162, 164, 166, 160), video (180, 209), data communications (167), I/O (178), and disk storage (170).

Disposed in RAM are an AIA (196) that operates through an API (198) a CRM application program (195) that exposes and operates a GUI dashboard (110), communications sessions (140) and communications contacts (144) established and administered by the CRM application and the AIA running on the computer (152) and, sessions and contacts structure and content (509) to be parsed into triples (752), inference rules (376), a natural language processing ("NLP") engine (155), a parsing engine (380), an inference engine (298), and a semantic reasoner (378). Also disposed in RAM are a triple serializer (294), a triple converter (292), and one or more triple files (290). The NLP engine optionally eases the parsing process by first processing the structure and content (509) into sentences and parts of speech before providing the words so processed to the parsing engine. The parsing engine parses the structure and content into parsed triples (752). The inference engine (298) takes as inputs the parsed triples (752) and the inference rules (376) and infers inferred triples (754).

The serializer (294) administers the transfer of triples between triple stores (752, 754) in RAM and disk storage or other non-volatile storage. The serializer (294) accepts as inputs the contents of triple stores and serializes them for output as triple files (290), tables, relational database records, spreadsheets, text documents, or the like, for long-term storage in non-volatile memory, such as, for example, on a hard disk (170). The serializer (294) accepts triple files (290) as inputs and outputs parsed triples into triple stores in RAM. In many embodiments, when the serializer (294) accepts triple files (290) as inputs and outputs parsed triples into triple stores in RAM, the serializer stores the output triple stores into contiguous segments of memory. Contiguous storage can be effected in the C programming language by calls to the malloc( ) function. Contiguous storage can be effected by the Python buffer protocol. Contiguous storage can be effected in other ways as will occur to those of skill in the art, and all such ways are within the scope of the present invention. In many embodiments, triple stores (752, 754) would be stored in segments of contiguous memory.

The speech-engine (153) is a full-service NLP-SR engine that includes natural language processing (155), speech recognition (150), a grammar (104), a lexicon (106), a model (108), and text-to-speech processing (194), all as described in more detail above with regard to FIG. 6. The thick-client speech-enabled device (152) has no need to reach across a network for speech-related processing. Full speech enablement is available directly on the thick client computer itself.

The overall example computer system illustrated in FIG. 9 operates generally to implement CRM according to embodiments of the present invention by administering, by an artificial intelligence agent ('AIA') (196) of a CRM application (195) of the computer system, with a customer representative on behalf of a tele-agent, as structure of computer memory (169) of the computer system, a communications session (140) composed of one or more communications contacts (144) with the customer representative. The AIA (196) also carries out communications with the tele-agent in support of the communications session (140). The AIA and CRM application establish, upon a first communications contact between a tele-agent and a customer representative, as structure of computer memory (168) of the computer system, a communications session (140). In establishing a session, the AIA and the CRM application establish, as structure of computer memory of the computer system, a session (140) as an object-oriented module of automated computing machinery whose structure and contents (509) are also stored as semantic triples (752, 754) in an enterprise knowledge graph (154). That is, a session in this example is established initially at least as an instance of an object-oriented session class. Establishing such a session includes storing in computer memory as member data elements of the session a subject code, a timestamp, identification of the tele-agent, identification of the customer representative, and optionally as well other information regarding the session.

The AIA and CRM application also administer through the communications session (140) across communications platforms a sequence of communications contacts (144), including the first contact and also subsequent communications contacts, between the tele-agent and a customer representative. The computer system administers a sequence of contacts by establishing each contact as an object-oriented module of automated computing machinery that structures computer memory (168) of the computer system and whose structure and contents (509) are also stored as semantic triples in an enterprise knowledge graph (154). That is, a contact (144) in this example is established initially at least as an instance of an object-oriented contact class. Administering a sequence of contacts includes recording in computer memory as member data elements of each contact a timestamp beginning the contact, duration of the contact, a session identifier for the contact, platform type, contact status, any communications content of the contact, and optionally as well other information regarding the contact.

Figure 10:
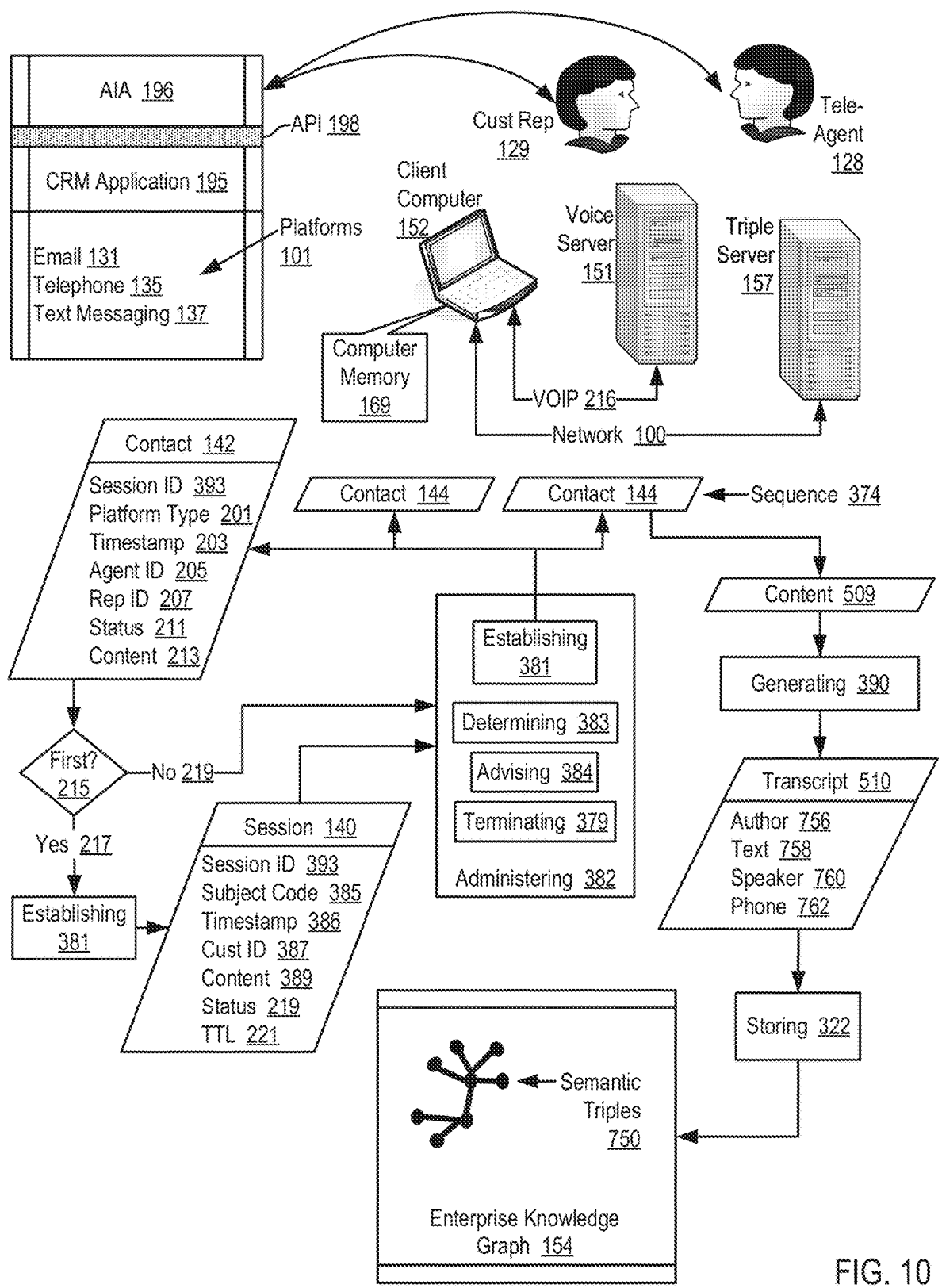
FIGS. 10-13 set forth flow charts illustrating example methods of CRM according to embodiments of the present invention.

For further explanation, FIG. 10 sets forth a flow chart illustrating an example method of CRM according to embodiments of the present invention. Functions in the method of FIG. 10 are implemented with or disposed upon some combination of a client computer (152), a voice server (151), and a triple server (157). That is, for example, a speech engine can be disposed upon the voice server (151) in a thin-client architecture or upon the client (152) in a thick-client architecture. And parsing and inference can be carried out either on a triple server (157) or on a client computer (152). Except for the parsing (304) and inferring (754), which are implemented respectively with a parsing engine and an inference engine, the method processes in this example are implemented generally by a CRM application program (195) operated by an AIA (196) through an application programming interface or API (198). The question exactly where any particular function occurs depends upon the architecture—although all structural elements are computers or components of computers—and they are all configured to operate together, in one architecture or another, to carry out CRM according to embodiments.

The method of FIG. 10 includes establishing (381) by the computer system, upon a first communications contact between a tele-agent (128) and a customer representative (129), as structure of computer memory of the computer system, a communications session (140). The AIA (196) initiates the contact through the API (198) on one of the available communications platforms (101) and calls the establishing function (381) of the CRM application (195) through the API (198). The notion of a 'first' contact here refers to a first contact, among what is expected to be multiple contacts, regarding a particular subject matter and a particular customer, that is, a customer that is represented by the customer representative. In the example of FIG. 10, establishing (381) a session is carried out by establishing, as structure of computer memory of the computer system, a session as an object-oriented module of automated computing machinery. That is, a session (140) in this example is an object that instantiates an object-oriented session class. In this example, the session (140) so instantiated contains member data elements that include a session identification code (393), a subject code (385) that identifies the subject of contacts between agents of a contact center and a customer representative, and a code (387) that identifies a customer that is represented in contacts of the session, that is, represented by a customer representative in contacts between a customer representative and an agent.

The AIA (106) can determine (215) whether a new contact is a first contact of a session by searching session memory for a session for a customer and subject of the new contact. Finding no match (217), the AIA calls the establishing function (381) for a new session (140), records the new session ID (393) in both the new session (140) and the first contact (142), and hands off the new session and the new contact to the administration function (382). Finding a match (219), the AIA records the found session ID in the new contact and hands off the found session ID and the new contact to the administration function (382). The session ID (393) functions as a foreign key linking the session to all contacts associated with the session. The session thus functions as a wrapper or container for all contacts linked by the session ID. In this example, identification codes for a tele-agent and a customer representative (205, 207), recorded in the contact (142), are not recorded in the session. This example session (140) therefore can serve as a wrapper, for contacts related to a customer and having a particular subject matter, for multiple contacts among multiple tele-agents and multiple customer representatives.

The session's member data elements include a timestamp (386) for when the session (140) in created. A session can also include a time limit (221), represented here as a time-to-live or 'TTL,' after which the session is either terminated or a user is notified of a timeout and prompted whether to terminate the session. A session can also include a status code (219) to indicate whether the session is active or terminated. Terminated sessions retained in storage optionally can be configured to be reactivated.

The session member data elements in this example also include a content element (389). A typical use for the content element (389) is to elaborate on the subject matter (385) of contacts of the session. The content (213) of communications in the contacts in this example are stored in association with the contacts themselves (142, 144) rather than in a session object. In many embodiments, the structure and content of the session (140), typically including all session data elements and optionally others as well, after parsing (304) into semantic triples, are stored as semantic triples in an enterprise knowledge graph (154).

The method of FIG. 10 also includes administering (382), by an AIA (196) of a CRM application (196) of the computer system (152, 151, 157), with a customer representative (129) on behalf of a tele-agent (128), as structure of computer memory (169) of the computer system, a communications session (140) comprising one or more communications contacts (142, 144) with the customer representative (129). The session and contacts are structure of computer memory in that their aspects in data processing are implemented as memory structures, object-oriented classes and objects and the like. Their structures and contents are also structures of computer memory in that they are parsed into semantic triples and stored in an enterprise knowledge graph (154) which itself is also stored in computer memory. In at least some embodiments, moreover, the memory so structured is sought further to be structured by arranging its contents in contiguous storage.

In the method of FIG. 10, administering (382) a communications session and contacts is carried out across communications platforms for a sequence (374) of communications contacts, including the first contact (142) and also subsequent communications contacts (144), between the tele-agent and the customer representative. In the method of FIG. 10, communications platforms include telephones (135), text messaging platforms (137), email platforms (131), and chatbots (133). Text messaging platforms can include web chats through a web page exposed by the contact center, small message service (SMS) messages via telephone, or web-based text messaging in general through WhatsApp, Facebook Messenger, Snapchat, or the like. The AIA in this example administers all such platforms. The AIA can open a phone contact responsive to a tele-agent's invoking a GUI widget for a telephone. The AIA can accept typed text input or voice messaging into email or text messages. The AIA in this example is a module of automated computing machinery that implements an artificial intelligence platform emulating human behavior in computer-administered communications. The AIA supports communications both with customer representatives and with tele-agents with speech and text messages composed by VXML dialogs or the like to emulate human speech. The AIA implements machine learning by parsing the structure and content of communications contacts into new semantic triples and inferring new inferred triples from the parsed triples.

In the method of FIG. 10, administering communications contacts in embodiments often includes determining (383) a communications platform type (201) for each communications contact (142, 144). Communications contacts can be implemented through the AIA, and determining a platform type can be by user GUI operation. That is, for example, a platform can be expressly selected by a tele-agent's invoking GUI widgets for the platforms, phone call, text message, and so on. A tele-agent can select a target of a contact dialing or from a contacts list, the AIA can then note the intended representative identification (207) in the contact, and infer from the dialing or the contact selection that the platform type is a telephone.

Communications contacts can be implemented through speech alone without GUI operations, including determining platform types. A tele-agent can issue oral instructions to the AIA, "Computer, email Bob and ask to schedule a call." "Computer, text Bob and ask him to reschedule our call." "Computer, ring Bob for me and if he doesn't answer, leave a message asking for a call back." Each of these examples expressly identifies a platform type, respectively, email, text message, and telephone.

In the method of FIG. 10, administering (382) across platforms can be carried out by administering across platform types. A tele-agent can implement with a customer representative a sequence of contacts, each of which can be by a same platform or platform type, all on telephone, or each of which can be by different platforms, phone, email, text, and so on. The AIA and the administration function handle all platform types equally, even in a sequence of contact by a same tele-agent with a same customer representative.

In the method of FIG. 10, administering contacts across platforms can be carried out by administering contacts asynchronously across platforms. That is, timing is not a limitation of the functionality of CRM according to embodiments. A tele-agent can phone a same customer representative today with the call administered, a contact established, contents recorded, elements parsed, triples stored, and so on. The tele-agent can email the same customer representative tomorrow with the email administered, a contact established, contents recorded, elements parsed, triples stored, and so on. The tele-agent can text the same customer representative the next day with the text message administered, a contact established, contents recorded, elements parsed, triples stored, and so on. The AIA (196) and the administration function (382) work asynchronously across platforms.

In the method of FIG. 10, administering (382) sessions and contacts across platforms can be carried out by administering contacts across physical locations of platforms. That is, location is not a limitation of the functionality of CRM according to embodiments. A tele-agent can phone a same customer representative today from an automobile on a freeway with the call administered, a contact established, contents recorded, elements parsed, triples stored, and so on. The tele-agent can email the same customer representative tomorrow from an agent's desk in a call center with the email administered, a contact established, contents recorded, elements parsed, triples stored, and so on. The tele-agent can text the same customer representative the next day by use of the agent's smart phone in the agent's home office with the text message administered, a contact established, contents recorded, elements parsed, triples stored, and so on. The AIA (196) and the administration function (382) work regardless of the physical location of a platform.

In the method of FIG. 10, administering (382) a session and a sequence (374) of contacts includes establishing each contact as an object-oriented module of automated computing machinery that structures computer memory of the computer system and whose structure and contents are also stored as semantic triples in an enterprise knowledge graph. That is, contacts in this example are instances of an object oriented contact class. The structure of objects of the class is illustrated by the contents of the first contact (142), although the structure of all such contact objects (144, 374) would be similar.

In the example of FIG. 10, administering (382) a session and a sequence of contacts includes recording in computer memory for each contact a session identifier (393) for the contact, a timestamp (203), platform type (201), contact status (211), and any communications content (213) of the contact. The session identifier (393) relates each contact of a session to the pertinent session. The timestamp (203) records the date and time when a contact is initiated. In this example, contacts include failed attempts at contact. That is, in the method of FIG. 10, communications contacts (142, 144) include both instances of actual communications between a tele-agent and a customer representative and also failed attempts at such communications.

The status code (211) can be used to indicate success or failure of a contact. The AIA with voice enablement can indicate in response to a status query from a tele-agent, "You tried him last Wednesday and left a message, but we have had no further contact." The contact structure in this example includes identification codes for the agent (205) who initiated the contact and the customer representative (207) who was sought to be contacted. Because the agent ID and the customer representative ID are recorded in the contact rather than the session, this example session structure (140) can serve as a wrapper, for contacts related to a customer and having a particular subject matter, for multiple contacts among multiple agents and multiple customer representatives.

To the extent that the content (213) of a communications contact is speech, the speech is optionally either recorded raw with a URL locating it in a stored triple—or recognized into text and then stored as an element of a contact of a session. For a transcript, to automate speaker recognition, an example computer system, CRM applications, and AIA according to embodiments implements a speech recognition function running in a loop with current voice print extraction and comparison with previously stored voice prints of known speakers. For a new speaker with no voice print on record, a computer according to embodiments can take speaker identification from context, e.g., a tele-agent telephoned a particular customer representative selected from an address list. Alternatively for a new speaker with no voice print on record, an AIA according to embodiments can prompt for identification, "Excuse me, I did not catch your name." Other ways to associate a new speaker with a voice print may occur to implementers, and all such ways are well within the scope of the present invention.

In the method of FIG. 10, administering (382) a session (140) and its sequence (374) of contacts in some embodiments includes advising (384) a tele-agent (128) upon request of the status (219) of communications under a session (140). The AIA (196) by the administration process (382) can list in widgets of a GUI of a CRM application all open sessions, closed sessions, contacts of each session, contents of each contact, and so on. The AIA (196) by the administration process (382) can accept voice requests and return status by speech, e.g., "Computer, what is our communications status with Bob?" Answer: "You have no open session with Bob." Or, "You have an open session, the last contact was an email from you to him on March 25, no response. Shall I read you the email?"

In the method of FIG. 10, administering (382) a session and a sequence of contacts in some embodiments includes terminating (379) a session. According to a tele-agent instruction to do so, the AIA (196) through the administration process can mark session status (219) as "terminated" or "inactive" or the like. The AIA through the administration process can terminate a session according to a time-out, that is, a predetermined duration for a session, implemented for example by comparing a timestamp (386) when the session was initiated with a time-to-live (221) element and the current date and time, optionally advising a tele-agent of the time-out, and asking whether to terminate. Administering sessions and contacts can also include reactivating a terminated session, by, for example, marking pertinent status triples in the knowledge graph as "active" rather than "inactive"—or even retrieving pertinent triples from the knowledge graph and, based upon them, rebuilding an object-oriented session object plus all its contact objects.

The method of FIG. 10 also includes generating (390) by the computer system a digital transcript (510) of the content (509) of the communications contacts (142, 144). Later in processing among embodiments, the transcript will be implemented as semantic triples, but the digital transcript (510) in this example is first an object-oriented instantiation of an object of a transcript class having member data elements. In the example of FIG. 10, the digital transcript's member data elements include content (758) from text messaging and email identified by author (756), as well as content (762) from telephone conversations identified by speaker (760).

The method of FIG. 10 also includes storing (322) the content of the transcript (750) in the enterprise knowledge graph (154) in the form of semantic triples (750). In some embodiments, the enterprise knowledge graph (154) is composed of triples (750) of a description logic that includes as stored all CRM-related knowledge that is available to a tele-agent through a CRM system. In some embodiments, the storing process (322) disposes at least some subgraphs of structure and content of session and communications contacts within the overall enterprise knowledge graph within segments of contiguous computer memory.

Figure 11:
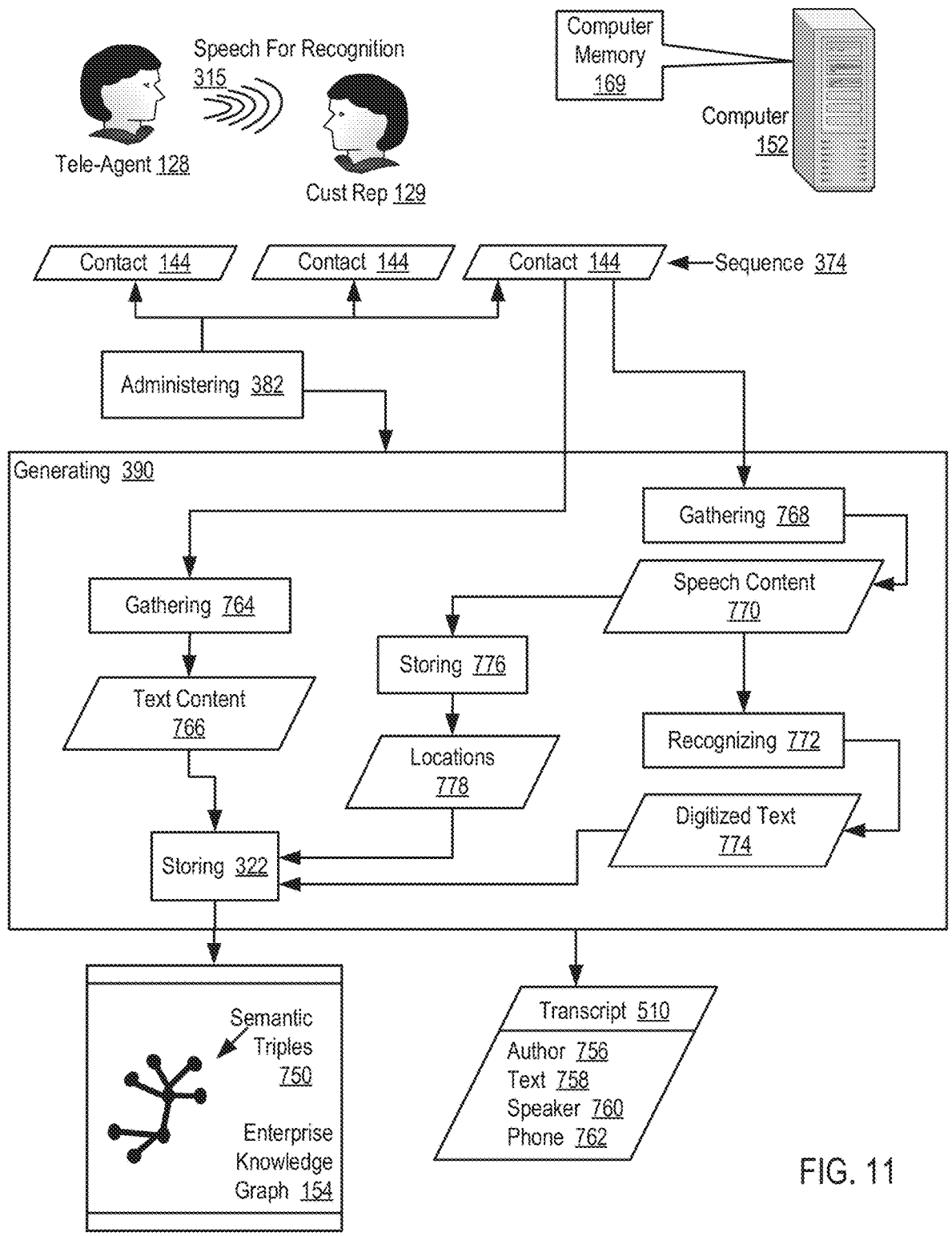

For further explanation, FIG. 11 sets forth a flow chart illustrating a further example method of CRM according to embodiments of the present invention. The method of FIG. 11 is similar to the example method of FIG. 10, including as it does establishing (381) by a computer system (151, 152, 157), upon a first communications contact (142) between a tele-agent (128) and a customer representative (129), as structure of computer memory of the computer system, a communications session (140). In this example embodiments, the session (140) is structure of a computer memory in that the session can be implemented as an instance of an object-oriented session class. Also like the method of FIG. 10, the method of FIG. 11 includes administering (382) communications sessions and contacts as well as generating (390) a digital transcript (510) of the content (509) of the communications contacts (142, 144) and storing (322) the content of the transcript (750) in the enterprise knowledge graph (154) in the form of semantic triples (750). In some embodiments, the enterprise knowledge graph (154) is composed of triples (750) of a description logic that includes as stored all CRM-related knowledge that is available to a tele-agent through a CRM system. In some embodiments, the storing process (322) disposes at least some subgraphs of structure and content of communications contacts within the overall enterprise knowledge graph within segments of contiguous computer memory.

In addition to those similarities to the method of FIG. 10, the method of FIG. 11 includes three alternative ways of acquiring content for storage in the transcript or for inclusion in semantic triples. In the method of FIG. 11, as a first alternative way of gathering content, generating (390) a transcript (510) is implemented by gathering (764) text content (766) from contacts (144) that effect communications by text messages and emails and storing (322) the gathered text content as semantic triples (750) in an enterprise knowledge graph (154). The text content (766) can be had from the emails and text messages themselves, which can be created and handled directly by an AIA, a CRM application, or the like. The text content can be had from the contacts themselves, that is, from member data elements in their implementations as objects of a contact class. Or the text content can be had from member data elements (758) of a transcript, that is, from member data elements in a transcript's implementation as an object of a transcript class.

In the method of FIG. 11, as a second alternative way of gathering content, generating (390) a transcript (510) is implemented by capturing (768) speech content (770) from telephone conversations (315) between the tele-agent (128) and the customer representative (129), recognizing (772) the speech content into digitized text (774), and storing (322) the digitized text as semantic triples (750) in an enterprise knowledge graph (154). The speech content is acquired through a microphone and amplifier of the computer system (152, 151). Recognizing the speech content into digitized text is carried out by a speech engine (153 on FIG. 6) as described in this paper.

In the method of FIG. 11, as a third alternative way of gathering content, generating (390) a transcript (510) is implemented by storing (776) speech content (770) from telephone conversations between the tele-agent and the customer representative and storing (322), as semantic triples (750) in an enterprise knowledge graph (778), storage locations of the stored speech. The speech content in this example is merely raw recorded audio of a conversation. The storing step (776) stores the audio at some location in memory, on disk, for example, and the locations (778) are implemented as URLs that specify the locations in computer memory (169), local memory, disk, or the like, of raw audio recordings. It is the URLs that the storing step (322) stores in semantic triples in the enterprise knowledge graph as locations (778) of speech content (770).

Figure 12:
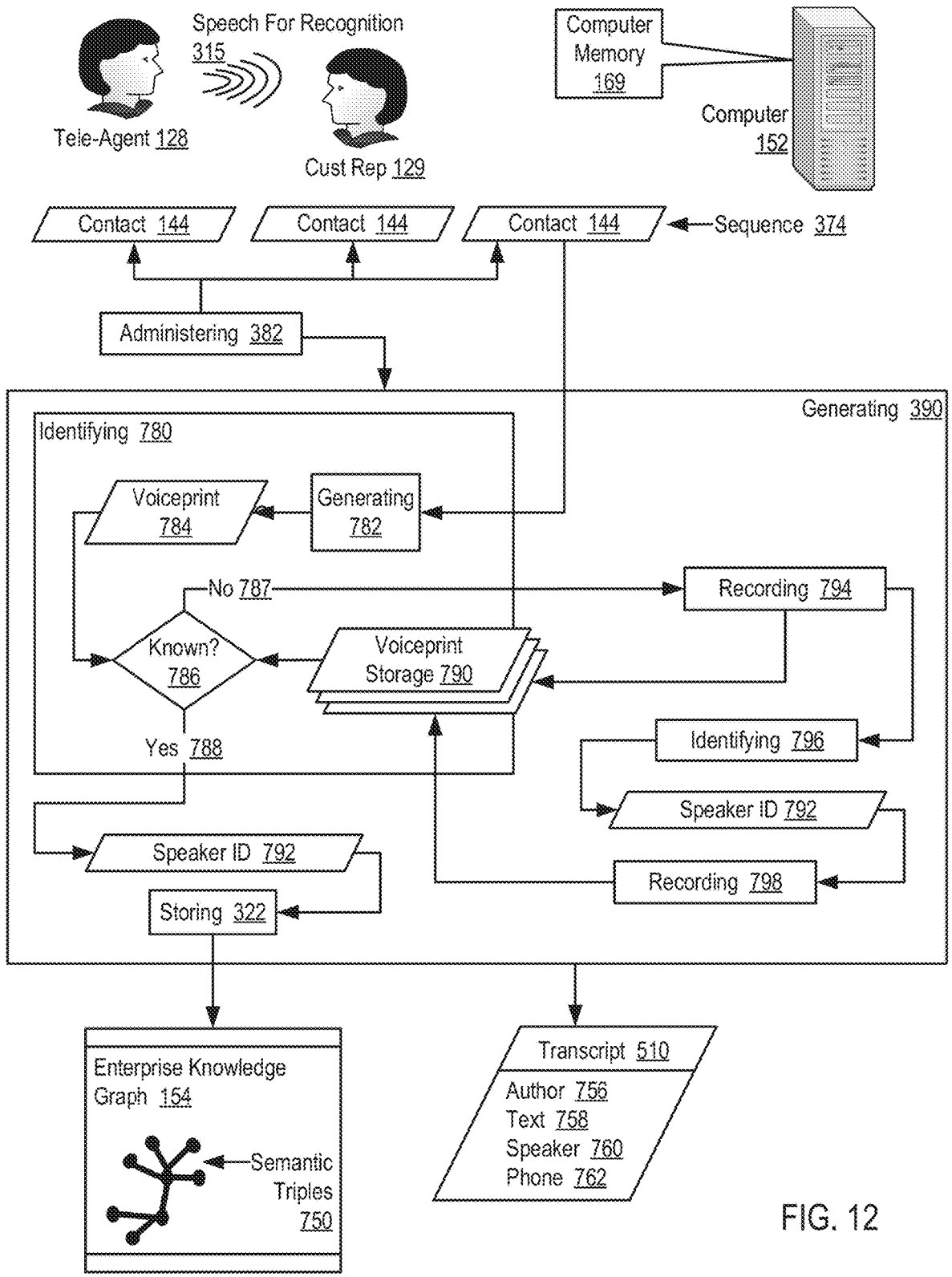

For further explanation, FIG. 12 sets forth a flow chart illustrating a further example method of CRM according to embodiments of the present invention. The method of FIG. 12 is similar to the example method of FIG. 10, including as it does establishing (381) by a computer system (151, 152, 157), upon a first communications contact (142) between a tele-agent (128) and a customer representative (129), as structure of computer memory of the computer system, a communications session (140). In this example embodiments, the session (140) is structure of a computer memory in that the session can be implemented as an instance of an object-oriented session class. Also like the method of FIG. 10, the method of FIG. 12 includes administering (382) communications sessions and contacts as well as generating (390) a digital transcript (510) of the content (509) of the communications contacts (142, 144) and storing (322) the content of the transcript (750) in the enterprise knowledge graph (154) in the form of semantic triples (750). In some embodiments, the enterprise knowledge graph (154) is composed of triples (750) of a description logic that includes as stored all CRM-related knowledge that is available to a tele-agent through a CRM system. In some embodiments, the storing process (322) disposes at least some subgraphs of structure and content of communications contacts within the overall enterprise knowledge graph within segments of contiguous computer memory.

In addition to those similarities to the method of FIG. 10, in the method of FIG. 12, generating a transcript is carried out by identifying (780) by voiceprint comparison the speakers in a conversation between the tele-agent and one or more customer representatives. Identifying (780) includes generating for each speaker in a current conversation a voiceprint and determining (786) whether the generated voiceprint is known to the system, that is, whether it matches a pre-recorded voiceprint in storage (790). The voiceprints can be implemented as i-vectors, d-vectors, acoustic models with Fourier components, and so on. Each voiceprint in storage is stored in association with a speaker identification, so finding a match (788) identifies a speaker (792).

A new speaker, one not known to the system, will have pre-recorded no voiceprint in storage (790). The method of FIG. 12 includes determining (786) by voiceprint comparison during a telephone conversation between the tele-agent and a customer representative that the customer representative is unknown (787) to the computer system. That is, the determining process (786) could find no match between a currently generated voiceprint (784) for a current speaker and any voiceprint in storage (790). The system then records (794) the current voiceprint (784) in voiceprint storage (790), that is, records a voiceprint for the unknown representative. The system then identifies (792) the unknown representative, and records the now-identified representative in association with the now-recorded and stored voiceprint. There is no timing constraint on the identification process (796). An AIA can wait until the conversation is over and then simply ask the tele-agent to whom he was speaking. The AIA can ask in real time, "Excuse me, I did not catch your name."

Figure 13:
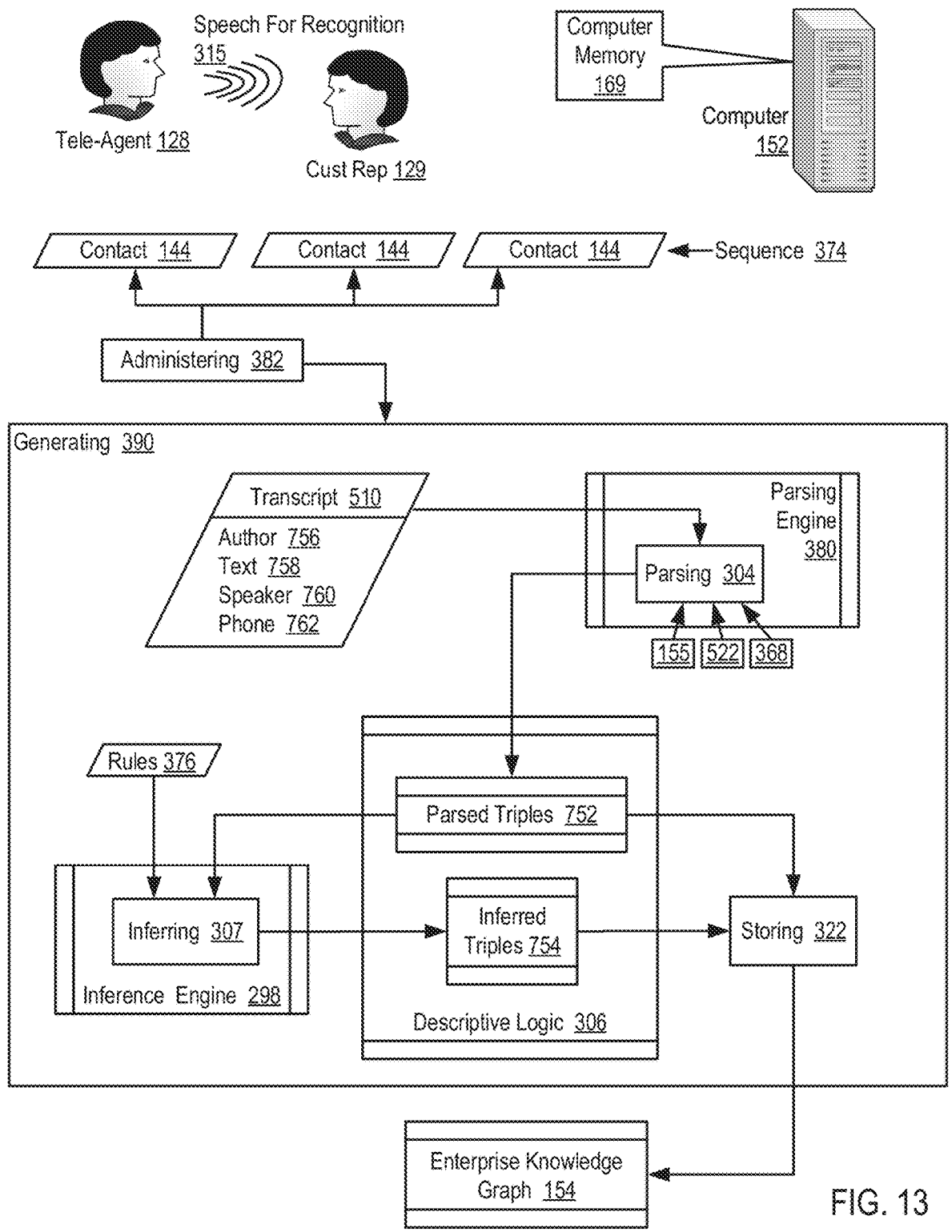

For further explanation, FIG. 13 sets forth a flow chart illustrating a further example method of CRM according to embodiments of the present invention. The method of FIG. 13 is similar to the example method of FIG. 10, including as it does establishing (381) by a computer system (151, 152, 157), upon a first communications contact (142) between a tele-agent (128) and a customer representative (129), as structure of computer memory of the computer system, a communications session (140). In this example embodiments, the session (140) is structure of a computer memory in that the session can be implemented as an instance of an object-oriented session class. Also like the method of FIG. 10, the method of FIG. 13 includes administering (382) communications sessions and contacts as well as generating (390) a digital transcript (510) of the content (509) of the communications contacts (142, 144) and storing (322) the content of the transcript in the enterprise knowledge graph (154) in the form of semantic triples (750). In some embodiments, the enterprise knowledge graph (154) is composed of triples (750) of a description logic that includes as stored all CRM-related knowledge that is available to a tele-agent through a CRM system. In some embodiments, the storing process (322) disposes at least some subgraphs of structure and content of communications contacts within the overall enterprise knowledge graph within segments of contiguous computer memory.

In addition to those similarities to the method of FIG. 10, in the method of FIG. 13, generating a transcript is carried out by parsing (304), by a parsing engine (380) of the computer system into parsed triples (752) of a description logic (306), the content (758, 762) of the transcript (510). In at least some embodiments, the description logic is a member of a family of formal knowledge representation languages in which a query of the logic is decidable.

The parsing process (304) functions by forming words from content (758, 762) into semantic triples (752). The parsing process (304) can function by forming into semantic triples (752) words designated through GUI widgets (368) as element of triples, subject, predicate, object. The parsing process (304) can function by forming into semantic triples (752) words designated through voice commands in a VoiceXML dialog (522) as elements of triples, subject, predicate, object. The parsing process (304) can function by forming into semantic triples (752) words designated by a natural language processing engine (155) as parts of speech, subject, predicate, object. The parsing process hands off the parsed triples (752) to the inference engine (298) and the storage function (322) for further processing. In many embodiments, the parsing process hands off the parsed triples (752) to the inference engine (298) and the storage function (322) by disposing the parsed triples in segments of contiguous memory and providing to the inference engine (298) and the storage function (322) memory addresses for the segments.

The method of FIG. 13 also includes inferring (307), by an inference engine (298) from the parsed triples according to inference rules (376) of an enterprise knowledge graph (154) of the computer system, inferred triples (754). One effect of running inference against the smaller sets of triples parsed from transcripts of contacts of sessions is to reduce the burden of running inference rules against an entire enterprise knowledge graph. Inferring triples in the smaller chunks of data represented by a transcript of a set of contacts organized in a session is a much smaller data processing task than running inference rules against an entire enterprise knowledge graph, and yet inferring triples in the smaller chunks of data represented by such transcripts generates inferred triples that are identical to triples inferred by running inference rules against an entire enterprise knowledge graph.

The method of FIG. 13 also includes storing (322) the parsed triples (752) and the inferred triples (754) in the enterprise knowledge graph (154). In some embodiments, the enterprise knowledge graph is composed of triples of a description logic comprising all CRM-related knowledge that is available to a tele-agent through a CRM system. In some embodiments, at least some subgraphs of structure and content of session and communications contacts within the overall enterprise knowledge graph are disposed within segments of contiguous computer memory.

Figure 14:
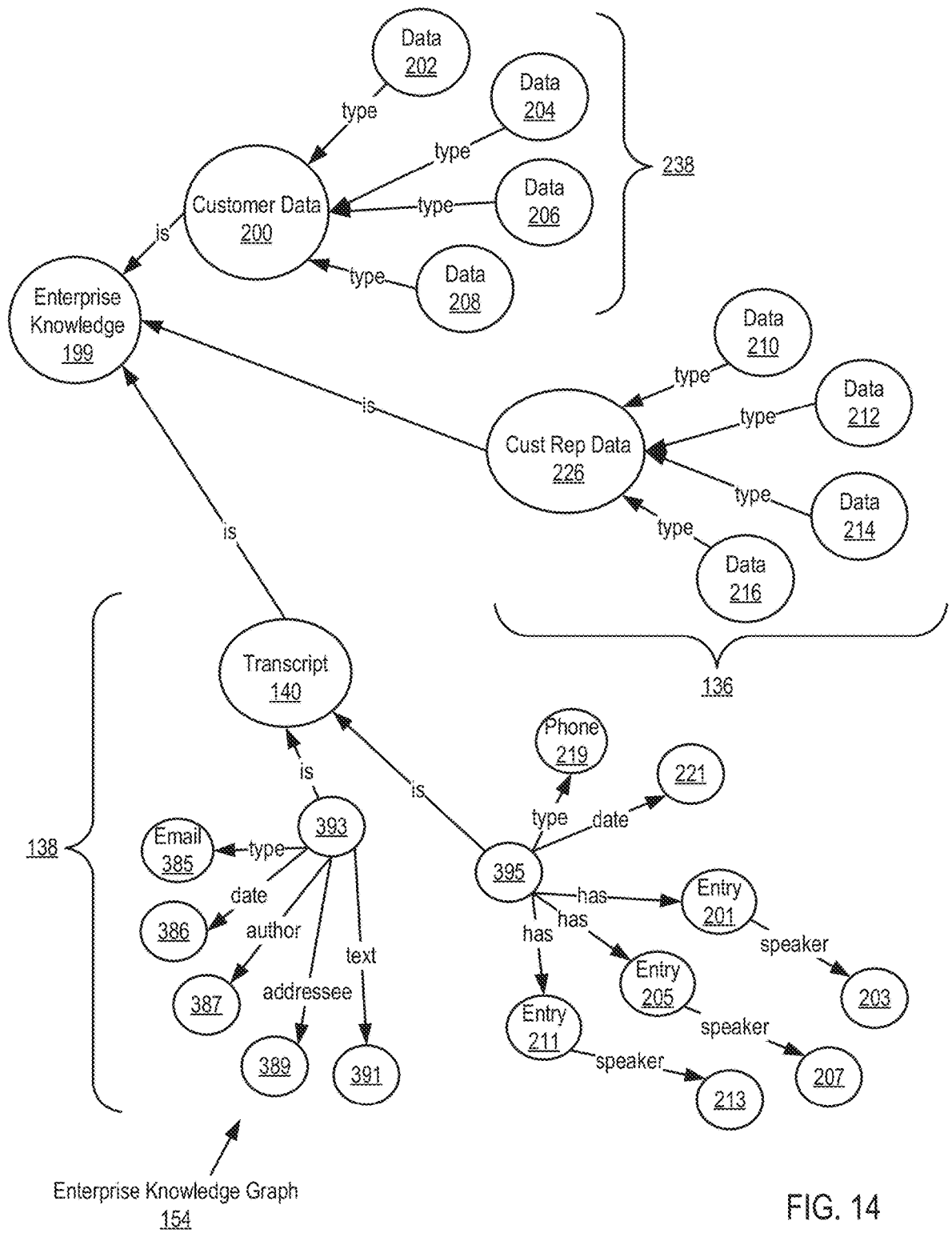
FIG. 14 sets forth an example enterprise knowledge graph in which triples regarding customers, customer representatives, and transcripts are implemented as subgraphs.

For further explanation, FIG. 14 sets forth an example enterprise knowledge graph (154) in which type-coded subgraphs (238, 136, 138) are implemented as logically-connected segments of the overall knowledge graph. All the nodes and edges in the example graph (154) of FIG. 14 are elements of semantic triples. The example graph (154) includes subgraphs type-coded as customer information (238), customer representative information (136), and transcripts (140). These three subgraphs are merely examples, not limitations of enterprise knowledge graphs. Enterprise knowledge graphs also will typically include financials, vendor information, business entities and structures, project information, corporate guidelines and manuals, employee data, incorporation data, transactions, contracts, sales histories, research details, and so on, and so on, and so on.

as well as an example of a session (140) whose structure, content, and contacts have been parsed into triples and stored in the enterprise knowledge graph (154).

The root of the graph (154) is a class object named Enterprise Knowledge (199). The nodes Customer Data (200), Cust Rep Data (226), and Transcript (140) denote subclasses of Enterprise Knowledge. The transcript subgraph (138) includes two subject nodes representing transcripts (393, 395). Both transcripts (393, 395) are examples of transcripts generated by gathering content from communications contacts and storing the content as semantic triples in an enterprise knowledge graph. The example of FIG. 14 also illustrates the fact that the parsing process can and will often result in multiple triples for each item that is parsed or inferred into semantic triples. Transcript (393) is characterized by predicate and object elements as of type email (385), date (386), author (387), addressee (389), and the text content of the email (391). Transcript (395) is characterized by predicate and object elements as of type phone conversation (219), date (221), and three transcript entries of content (201, 205, 211) each of which is characterized by an identified speaker (203, 207, 213).

Queries against a triple store in a graph like graph (154), such as, for example, queries used by semantic reasoners to extract prior content for use in present contacts, can include a clause specifying a subgraph:

```
Query:
    SELECT          ?subject
    WHERE           { ?subject  :is    :Transcript .
                      ?subject  :date  :date (221) . }
    Response: :Transcript(395)
```

Figure 15:
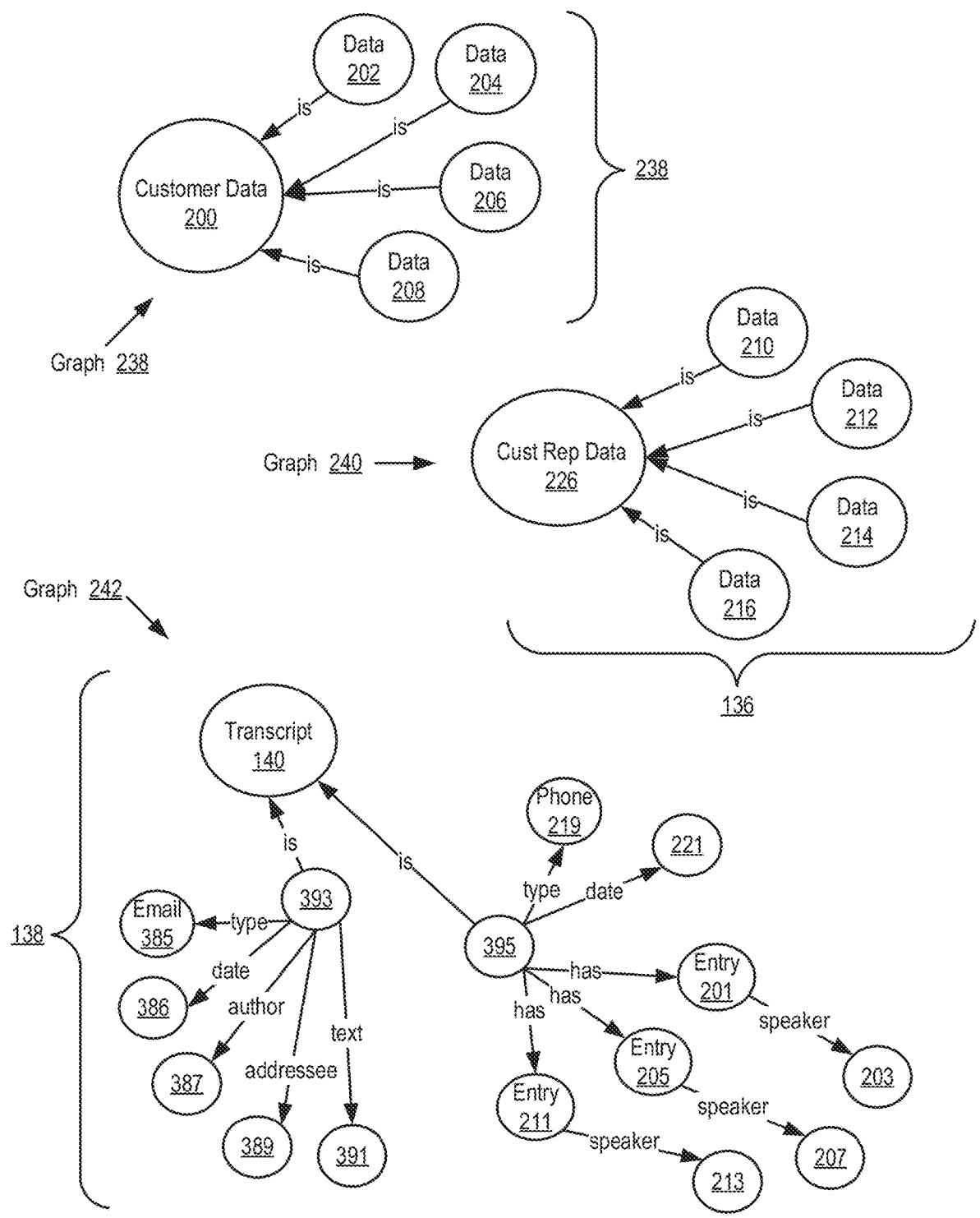
FIG. 15 sets forth an example graph set in which triples regarding customers, customer representatives, and transcripts are implemented as separate graphs.

For further explanation, FIG. 15 sets forth an example set of triple stores in which customer data (238), customer representative data (136), and transcripts (140) are implemented as separate graphs, (238, 240, 242) respectively. Readers will understand that an enterprise knowledge base will include more than these three kinds of information. The three independent graphs as well as additional such graphs can still implement elements of an overall enterprise knowledge base, except that the administrative processes for such a knowledge base may vary, because at least some of its semantic data is housed in separate graphs. Queries, for example, may be structured differently. Queries against a transcripts triple store in a graph like graph (242) may not need a clause specifying any particular subgraph:

```
Query:
    SELECT          ?subject
    WHERE           {?subject  :date  :date (221) . }
    Response: :Transcript(395)
```

Figure 16:
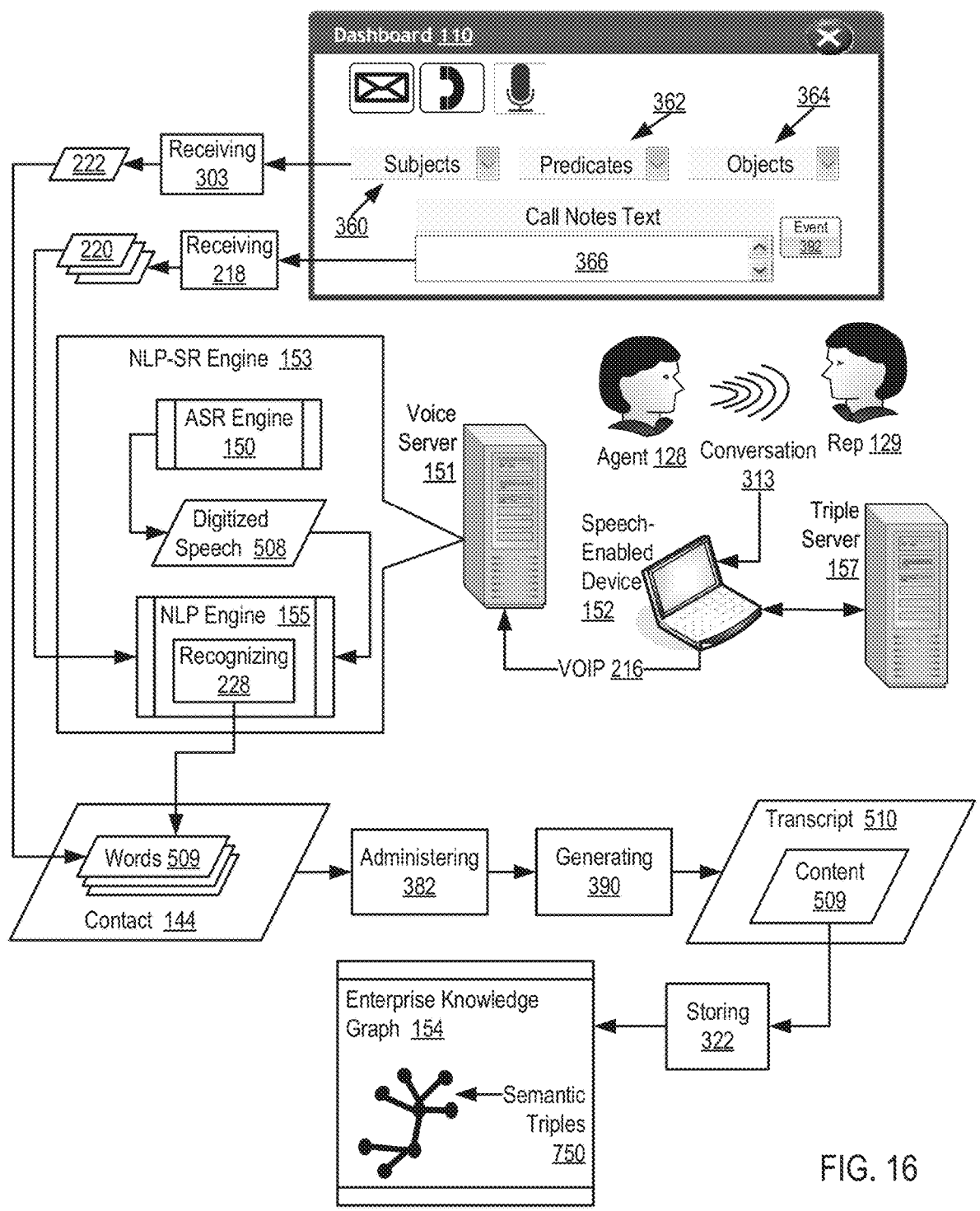
FIGS. 16 and 17 set forth flow charts illustrating further example methods of CRM according to embodiments of the present invention.

For further explanation, FIG. 16 sets forth a flow chart illustrating a further example method of CRM according to embodiments of the present invention. The method of FIG. 16 is similar to the example method of FIG. 10, including as it does administering (382) communications contacts (144) as well as generating (390) a digital transcript (510) of the content (509) of communications contacts and storing (322) the content of the transcript in the enterprise knowledge graph (154) in the form of semantic triples (750).

In addition to the similarities to the method of FIG. 10, the method of FIG. 16 includes three alternative ways of acquiring content for inclusion in semantic triples. Content in this example is composed primarily of words (509) spoken or typed into a computer system. So methods of acquiring content for inclusion in triples are typically aimed at acquiring words digitized for data processing in CRM. In a first alternative way of providing a digitized word to be stored as an element of a semantic triple, in the method of FIG. 16, a word (509) of digitized speech is recognized by a natural language processing speech recognition ("NLP-SR") engine (153) from a conversation (313) between a tele-agent (128) and a customer representative (129). That is, the method of FIG. 16 includes recognizing (228), by a natural language processing speech recognition ("NLP-SR") engine into digitized speech (508), words (509) from such a conversation. In this example method, recognizing speech from such a conversation is carried out by conducting words of speech from the conversation (313) through a microphone and amplifier on a speech-enabled device (152) and a VOIP connection (216) to a voice server (151) where a speech recognition engine (150) recognizes the words into a stream of digitized speech which is handed off to a natural language processing engine (155) which processes the digitized speech into sentences and parts of speech and passes the words so processed (509) to the parsing process (304) where they are parsed into triples (752). The administration process (382) passes the digitized words (509) to a parsing process as elements of the content (509) to be stored in triples. This is a first alternative way of providing digitized words (509) to store in triples.

In a second alternative way of providing digitized words to the storing process, the method of FIG. 16 also includes receiving (307) in a natural language processing engine words (220) of call notes from a text box widget (366) of a CRM dashboard (110). The tele-agent, in addition to or as an alternative to providing spoken content, types call notes into a GUI text box (366), and all the text so typed is provided by the dashboard (110) directly to a natural language processing engine (155) as digitized words (220). The text entry here is for example call notes, but the same processing is applied in embodiments to text entered into email messages, text messages, and the like. The natural language processing engine sees no difference between typed words (220) and words in a stream of digitized speech (508). Thus, this second alternative is similar to the first alternative with the exception that there is no need for speech recognition (150), because when a stream of digitized text arrives in the NLP-SR engine (153), the words in the stream are already digitized by typing in through the GUI widget text box (366). The natural language processing engine (155) works the same way as in the first alternative, processing the digitized text from the text box (366) into sentences and parts of speech and passing the words so processed (509) through the administration process (382) to the storing process (322) where they are parsed into semantic triples and stored. This is a second alternative way of providing digitized words (509) to be stored as triples in transcripts.

In a third alternative way of providing digitized words to the parsing process, the method of FIG. 16 also includes receiving (303) a word (222) designated as an element of a parsed triple through widgets (360, 362, 364) of a CRM dashboard (110). The widgets are pull-down menu listings of subjects for triples (360), predicates for triples (362), and objects for triples (364). The predicates (362) and objects (364) in at least this example embodiment are triple elements already defined in an ontology supportive of an enterprise knowledge graph (154). The subjects (360) are a stream of word candidates for inclusion in triples. Words in the subjects pull-down menu (360) are provided by the NLP-SR engine (153) from call notes text (366) or from words recognized from the conversation (313), for example. The tele-agent (128) passes a word (222) to the storage process (322) by selecting a word from the subjects pull-down menu (360), for example, selecting by keyboard or mouse. The tele-agent can optionally also select a predicate (362) or an object (364) for inclusion in the same triple with the selected subject. The tele-agent's selections of predicates and objects in some embodiments can be binding upon the storage process (322). In other embodiments, the tele-agent's selections are treated by the storing process merely as recommendations. The storing process optionally accepts the tele-agent's selections of predicates and objects, or the storing process makes its own selections of predicates and triples for inclusion with the word (222) in at least one parsed triple. This is a third alternative way of providing digitized words (509) to be stored in triples in transcripts.

Figure 17:
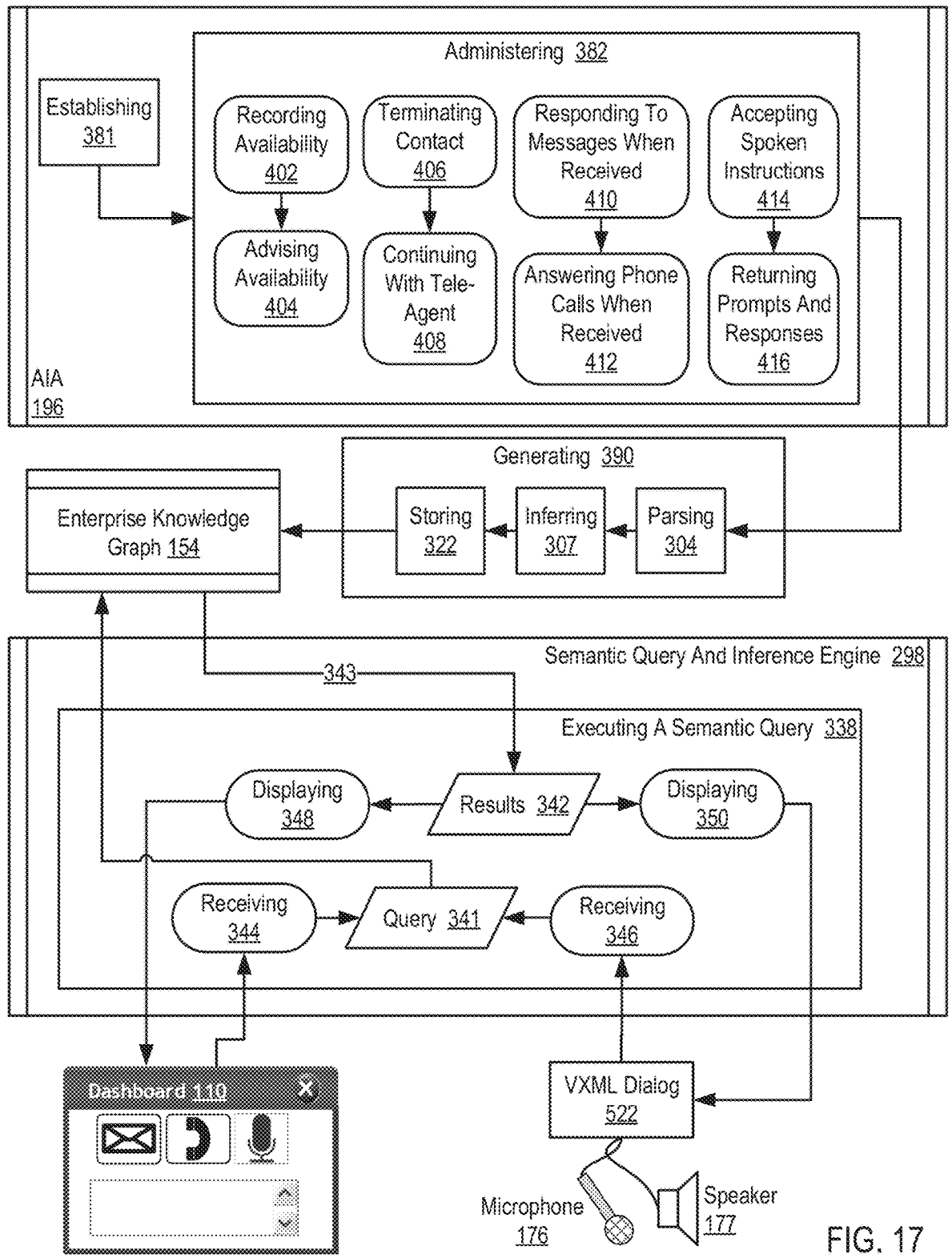

For further explanation, FIG. 17 sets forth a flow chart illustrating a further example method of CRM according to embodiments of the present invention. The method of FIG. 17 is similar to the example method of FIG. 10, including as it does administering (382) communications contacts (144) as well as generating (390) a digital transcript of the content of communications contacts and storing (322) the content of the transcript in the enterprise knowledge graph (154) in the form of semantic triples.

In addition to the above-mentioned similarities to the method of FIG. 10, the method of FIG. 17 includes several alternative ways of administering (382) communications sessions and contacts. In the method of FIG. 17, administering (382) contacts with a customer representative can for example include recording (402) the tele-agent's availability and advising (404) the customer representative of the tele-agent's availability. A tele-agent by voice or text entry or widget manipulation can advise the AIA (196), for example, "I'm in a meeting with Mike until 11:00." The AIA can by text, email, or telephone indicate to a customer representative, "Your tele-agent is in a meeting until 11:00. He'll contact you then."

In the method of FIG. 17, administering (382) contacts with a customer representative can for example include terminating (406) by the AIA a contact between the AIA and the representative and continuing (408) contacts of the session by a contact directly between the tele-agent and the customer representative. These method steps (406, 408) acknowledge that the AIA cannot handle everything and that the enterprise knowledge graph as well as the AIA's own programming will present limits after which the AIA is to turn a contact or a next contact over to a tele-agent, even if things are otherwise going well with the customer representative. The limits can include both limits on authority and limits on knowledge, and the limits in many embodiments will be defined in semantic triples of the enterprise knowledge graph.

In the method of FIG. 17, administering (382) contacts with a customer representative can for example include responding (410) by the AIA to text messages and email messages from the customer representative when the messages are received and answering (412) by the AIA a telephone call from the customer representative when the telephone call is received. The effect here is that all contacts initiated by a customer representative receive immediate responses. As soon as an email, text, or phone call comes in from a customer representative, the customer representative receives an immediate response regardless of the availability of a tele-agent.

In the method of FIG. 17, administering (382) contacts with a customer representative can for example include accepting (414) by the AIA spoken instructions from the customer representative and returning (416) by the AIA to the customer representative, in dependence upon the representative's instructions, voice prompts and spoken responses. Just as the AIA can converse with the tele-agent, the AIA can also carry out a VXML-based dialog with a customer representative. "This is Bob's AI. Bob's in with his boss. Can he call you in a bit?" "Yes, ask him to phone me later this morning." "Yes, I'll do that." After which, the AIA treats the customer representative's request as an instruction and calendars a phone call for the tele-agent, Bob.

The method of FIG. 17 includes executing (338) by a semantic query and inference engine (298) of a computer system against an enterprise knowledge graph (154) a semantic query (341) for semantic data recorded in the knowledge graph. The method of FIG. 17 also includes displaying (348, 350) results (342) of the semantic query (341). The data so sought is in one or more semantic triples or semantic subgraphs previously parsed (304) or inferred (307) and stored (322) in the enterprise knowledge graph (154).

The method of FIG. 17 includes executing (338) by a query engine (298) against the enterprise knowledge graph (154) a semantic query (341) for information from triples recorded in the enterprise knowledge graph (154). The semantic query is, for example, received (344) in the query and inference engine through an element of a GUI such as a dashboard (110)—or, for a further example, through a speech-enabled user interface such as a microphone (176)

and VoiceXML dialog (522). The query and inference engine (298) retrieves (343) and displays (348, 350) the results (342) of the semantic query (342) either back through the GUI (110) or through the speech-enabled user interface (522, 177). Again with reference to the graph regarding Bob and the Mona Lisa, this query, a further example for explanation, which requests predicates and objects from all triples in which Bob is the subject:

```
SELECT      ?predicate ?object
WHERE       { :Bob  :?predicate  :?subject .}
returns this:
  :isA              :person
  :isAFriendOf      :Alice
  :isBornOn         :"the 4th of July 1990"
  :isInterestedIn   :"the Mona Lisa")
This query:
SELECT      ?predicate ?object
WHERE       { :"the Mona Lisa"  :?predicate  :?subject .}
returns this:
  :wasCreatedBy     :"Leonardo da Vinci"
And this query:
SELECT      ?subject ?predicate ?object
WHERE       { :?subject  :?predicate  :?"the Mona Lisa" .}
returns this:
  :"the video 'La Joconde à Washington'"  :isAbout  :"the Mona Lisa"
```

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of customer relationship management ("CRM") implemented in a computer system, the method comprising:
   administering by the computer system a communications session comprising a sequence of communications contacts between a tele-agent and one or more customer representatives, the session and each contact comprising a structure of computer memory of the computer system; and
   generating by the computer system a digital transcript of the content of the communications contacts;
   wherein administering a communications session comprises establishing, as structure of computer memory of the computer system, the session and each contact as object-oriented modules of automated computing machinery whose structure and contents are also stored as semantic triples in an enterprise knowledge graph.

2. The method of claim 1 wherein administering a communications session comprises:
   storing in computer memory for the session a subject code, a timestamp, identification of the tele-agent, and identification of the customer representative; and
   storing in computer memory for each contact a timestamp beginning the contact, duration of the contact, a session identifier for the contact, platform type, contact status, and any communications content of the contact.

3. The method of claim 1 wherein the digital transcript comprises:
   content from text messaging and email identified by author; and
   content from telephone conversations identified by speaker.

4. The method of claim 1 wherein generating a transcript comprises:
   gathering text content from contacts that effect communications by text messages and emails; and
   storing the gathered text content as semantic triples in said enterprise knowledge graph.

5. The method of claim 1 wherein generating a transcript comprises:
   capturing speech content from telephone conversations between the tele-agent and the customer representative;
   recognizing the speech content into digitized text; and
   storing the digitized text as semantic triples in said enterprise knowledge graph.

6. The method of claim 1 wherein generating a transcript comprises:
   storing speech content from telephone conversations between the tele-agent and the customer representative; and
   storing, as semantic triples in said enterprise knowledge graph, storage locations of the stored speech.

7. The method of claim 1 wherein generating a transcript comprises identifying by voiceprint comparison the speakers in a conversation between the tele-agent and one or more customer representatives.

8. The method of claim 1 wherein generating a transcript comprises:
   determining by voiceprint comparison during a telephone conversation between the tele-agent and a customer representative that the customer representative is unknown to the computer system;
   recording by the computer system a voiceprint for the unknown representative;
   identifying by the computer system, by prompt and response for an identification, the unknown representative; and
   recording, by the computer system in association with the recorded voiceprint, the identity of the now-identified representative.

9. The method of claim 1 wherein generating a transcript comprises:
   parsing, by a parsing engine of the computer system into parsed triples of a description logic, the content of the transcript;
   inferring, by an inference engine from the parsed triples according to inference rules of said enterprise knowledge graph of the computer system, inferred triples; and
   storing the parsed triples and the inferred triples in the enterprise knowledge graph.

10. A computer system that implements customer relationship management ("CRM"), the computer system comprising a computer processor operatively coupled to computer memory, the computer processor configured to function by:
   administering by the computer system a communications session comprising a sequence of communications contacts between a tele-agent and one or more customer representatives, the session and each contact comprising a structure of computer memory of the computer system; and
   generating by the computer system a digital transcript of the content of the communications contacts;
   wherein administering a communications session comprises establishing, as structure of computer memory of the computer system, the session and each contact as object-oriented modules of automated computing machinery whose structure and contents are also stored as semantic triples in an enterprise knowledge graph.

11. The computer system of claim 10 wherein administering a communications session comprises:
- storing in computer memory for the session a subject code, a timestamp, identification of the tele-agent, and identification of the customer representative; and
- storing in computer memory for each contact a timestamp beginning the contact, duration of the contact, a session identifier for the contact, platform type, contact status, and any communications content of the contact.

12. The computer system of claim 10 wherein the digital transcript comprises:
- content from text messaging and email identified by author; and
- content from telephone conversations identified by speaker.

13. The computer system of claim 10 wherein generating a transcript comprises:
- gathering text content from contacts that effect communications by text messages and emails; and
- storing the gathered text content as semantic triples in said enterprise knowledge graph.

14. The computer system of claim 10 wherein generating a transcript comprises:
- capturing speech content from telephone conversations between the tele-agent and the customer representative;
- recognizing the speech content into digitized text; and
- storing the digitized text as semantic triples in said enterprise knowledge graph.

15. The computer system of claim 10 wherein generating a transcript comprises:
- storing speech content from telephone conversations between the tele-agent and the customer representative; and
- storing, as semantic triples in said enterprise knowledge graph, storage locations of the stored speech.

16. The computer system of claim 10 wherein generating a transcript comprises identifying by voiceprint comparison the speakers in a conversation between the tele-agent and one or more customer representatives.

17. The computer system of claim 10 wherein generating a transcript comprises:
- determining by voiceprint comparison during a telephone conversation between the tele-agent and a customer representative that the customer representative is unknown to the computer system;
- recording by the computer system a voiceprint for the unknown representative;
- identifying by the computer system, by prompt and response for an identification, the unknown representative; and
- recording, by the computer system in association with the recorded voiceprint, the identity of the now-identified representative.

18. The computer system of claim 10 wherein generating a transcript comprises:
- parsing, by a parsing engine of the computer system into parsed triples of a description logic, the content of the transcript;
- inferring, by an inference engine from the parsed triples according to inference rules of said enterprise knowledge graph of the computer system, inferred triples; and
- storing the parsed triples and the inferred triples in the enterprise knowledge graph.

* * * * *